(12) United States Patent
Mutnury et al.

(10) Patent No.: US 12,143,167 B2
(45) Date of Patent: Nov. 12, 2024

(54) SYSTEM AND METHOD OF MITIGATING OR ELIMINATING CROSSTALK WITH TRANSMISSION LINES

(71) Applicant: Dell Products L.P., Round Rock, TX (US)

(72) Inventors: Bhyrav Mutnury, Austin, TX (US); Sandor Farkas, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 603 days.

(21) Appl. No.: 17/451,969

(22) Filed: Oct. 22, 2021

(65) Prior Publication Data

US 2023/0125954 A1    Apr. 27, 2023

(51) Int. Cl.
*H04B 3/34*    (2006.01)

(52) U.S. Cl.
CPC ..................... *H04B 3/34* (2013.01)

(58) Field of Classification Search
CPC ....................................... H04B 3/34
USPC ........................................ 439/941
See application file for complete search history.

(56) References Cited

U.S. PATENT DOCUMENTS

| | | | | |
|---|---|---|---|---|
| 5,845,902 A * | 12/1998 | Takemoto | ............... | G07F 17/32 273/121 B |
| 8,128,436 B2 * | 3/2012 | Bopp | ................ | H01R 13/6658 439/676 |
| 9,017,105 B2 * | 4/2015 | Pao | ...................... | H01R 12/724 439/676 |
| 2004/0066326 A1 * | 4/2004 | Knapp | ............... | H01Q 1/1285 455/280 |

FOREIGN PATENT DOCUMENTS

| | | | | |
|---|---|---|---|---|
| GB | 2271678 A * | 4/1994 | ......... | H01R 13/6464 |
| WO | WO-2013174861 A1 * | 11/2013 | ....... | G06K 19/07786 |
| WO | WO-2017196652 A2 * | 11/2017 | ................ | H01P 3/08 |

\* cited by examiner

*Primary Examiner* — Gary F Paumen
(74) *Attorney, Agent, or Firm* — McDermott Will & Emery LLP

(57) ABSTRACT

In one or more embodiments, one or more systems, one or more methods, and/or one or more processes may receive, by a first conductive element of multiple conductive elements of an electromagnetic coupler device, a first signal; receive, by a second conductive element of the multiple conductive elements, a second signal; electromagnetically couple, by the multiple conductive elements, at least a portion of the first signal with the second signal; electromagnetically couple, by the multiple conductive elements, at least a portion of the second signal with the first signal; provide, by the first conductive element, the first signal with the at least the portion of the second signal to a first transmission line; and provide, by the second conductive element, the second signal with the at least the portion of the first signal to a second transmission line.

20 Claims, 16 Drawing Sheets

SYSTEM AND METHOD OF MITIGATING OR ELIMINATING CROSSTALK WITH TRANSMISSION LINES

BACKGROUND

Field of the Disclosure

This disclosure relates generally to information handling systems and more particularly to mitigating or eliminating crosstalk with transmission lines.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive, by a first conductive element of multiple conductive elements of an electromagnetic coupler device, a first signal; may receive, by a second conductive element of the multiple conductive elements, a second signal; may electromagnetically couple, by the multiple conductive elements, at least a portion of the first signal with the second signal; may electromagnetically couple, by the multiple conductive elements, at least a portion of the second signal with the first signal; may provide, by the first conductive element, the first signal with the at least the portion of the second signal to a first transmission line; and may provide, by the second conductive element, the second signal with the at least the portion of the first signal to a second transmission line.

In one or more embodiments, a third conductive element of the multiple conductive elements may have a forward "C" shape. In one or more embodiments, a fourth conductive element of the multiple conductive elements may have a backwards "C" shape. In one or more embodiments, the first conductive element and the second conductive element may be parallel to each other. In one example, the third conductive element, which may have the forward "C" shape, may be between the first conductive element and the second conductive element. In another example, the fourth conductive element, which may have the backwards "C" shape, may be between the first conductive element and the second conductive element.

In one or more embodiments, a third conductive element of the multiple conductive elements may have a forward "Z" shape. In one or more embodiments, a fourth conductive element of the multiple conductive elements may have a backwards "Z" shape. In one or more embodiments, the first conductive element and the second conductive element may be parallel to each other. In one example, the third conductive element, which may have the forward "Z" shape, may be between the first conductive element and the second conductive element. In another example, the fourth conductive element, which may have the backwards "Z" shape, may be between the first conductive element and the second conductive element.

In one or more embodiments, a third conductive element of the multiple conductive elements may have an "S" shape. In one or more embodiments, a fourth conductive element of the multiple conductive elements may be a resistor. For example, the resistor may be soldered to a top of the "S" shape of the third conductive element and may be soldered to a bottom of the "S" shape of the third conductive element. For instance, a longitudinal axis of the resistor may be parallel to a longitudinal axis of the "S" of the third conductive element. In one or more embodiments, the resistor may be a variable resistor. In one or more embodiments, the one or more systems, the one or more methods, and/or the one or more processes may further: receive, by the electromagnetic coupler device, information associated with setting the variable resistor to a resistance value; and configure, by the electromagnetic coupler device, the variable resistor to the resistance value. In one example, the variable resistor may include at least one transistor. In another example, the variable resistor may include at least one diode.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
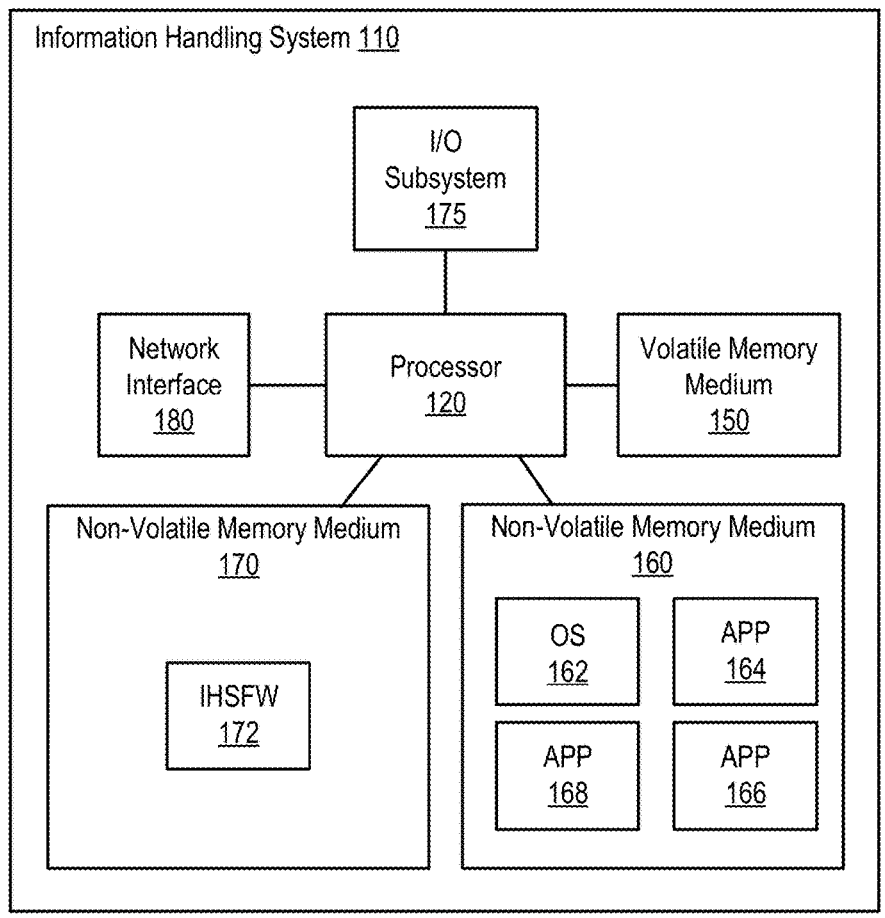
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, transmission lines may be utilized to transmit signals from a first component of an information handling system to a second component of the information handling system. In one example, a printed circuit board (PCB) may include the transmission lines. In another example, a cable may include the transmission lines. In one or more embodiments, transmission lines may be utilized to transmit signals from a first information handling system to a second information handling system. For example, transmission lines may be utilized to transmit signals from a first component of the first information handling system to a second component of the second information handling system.

In one or more embodiments, a transmission line may be a specialized cable or a trace of a PCB that is configured to conduct electromagnetic waves. For example, the term "transmission line" may apply when the conductors are long enough that wave natures of electromagnetic wave transmissions must be taken into account. For instance, this may especially apply to waves with high frequencies, since short wavelengths may mean that wave phenomena arise over very short distances. As an example, this may be as short as millimeters, depending on frequency. In one or more embodiments, a transmission line may include one or more metals and/or one or more semiconductors.

In one or more embodiments, signal performance in transmission lines may degrade as signal speed increases. In one or more embodiments, equalization approaches, both at a transmitter and a receiver, using techniques such as de-emphasis, pre-emphasis, continuous time linear equalization (CTLE), and decision feedback equalization (DFE), among others, may ensure that receivers compensate for channel losses. In one or more embodiments, even with such technology, crosstalk impact on signals may remain a challenge. For example, crosstalk may inject one or more unwanted signals with one or more amplitudes and/or one or more phase shifts into another transmission line. For instance, crosstalk may depend on one or more of a channel loss, a geometry, and an aggressor signal. In one or more embodiments, any an approach to mitigate crosstalk may remain challenging. For example, crosstalk may include a parasitic element that may not be undone with equalization.

In one or more embodiments, with interface speeds increasing there comes a point where better mitigation schemes may be utilized. For example, crosstalk may not be dampened due to the ultra-low loss PCB medium and/or cables. For instance, equalization may have become ubiquitous and may continue for high speed SerDes (serializers/deserializers) in the future. In one or more embodiments, equalization may not be effective against crosstalk, making high-speed systems vulnerable to signal degradation. In one example, Peripheral Component Interconnect Express (PCIe) generation six may utilize PAM4 (Pulse Amplitude Modulation with four levels) signaling to avoid increasing a toggle rate, but encoding may require lower signal to noise ratios, which may imply that these interfaces may be sensitive to crosstalk. In another example, as memory speeds increase, crosstalk may be or may become a limiting factor.

In one or more embodiments, one or more systems, one or more methods, and/or one or more processes described herein may minimize crosstalk over a wide band of frequencies, which may permit next generation high-speed interfaces to continue to be robust. For example, the one or more systems, the one or more methods, and/or the one or more processes described herein may preemptively inject opposing signals to cancel or mitigate what crosstalk adds. For instance, the one or more systems, the one or more methods, and/or the one or more processes described herein may couple a portion of a first signal (e.g., an aggressor signal) into a second signal (e.g., a victim channel).

In one or more embodiments, as crosstalk may be symmetrical, the second signal may have electromagnetic coupling back to the first signal, which may protect the first signal and the second signal. For example, an electromagnetic coupler device may perform attenuated coupling and phase shift. For instance, crosstalk reduction, by the electromagnetic coupler device, may be fine tuned by adjusting a coupling coefficient and a phase shift. In one or more embodiments, the electromagnetic coupler device may be implemented with one or more topologies and/or one or more components. In one or more embodiments, the one or more topologies may be implemented as edge coupled or broadside coupled structures, among others.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCIe root complexes. In another example, one or more of I/O subsystem 175 and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, OS 162 may include a management information exchange. In one example, the management information exchange may permit multiple components to exchange management information associated with managed elements and/or may permit control and/or management of the managed elements. In another example, the management information exchange may include a driver and/or a driver model that may provide an OS interface through which managed elements (e.g., elements of IHS 110) may provide information and/or notifications, among others. In one instance, the management information exchange may be or include a Windows Management Interface (WMI) for ACPI (available from Microsoft Corporation). In another instance, the management information exchange may be or include a Common Information Model (CIM) (available via the Distributed Management Task Force). In one or more embodiments, the management information exchange may include a combination of the WMI and the CIM. For example, WMI may be and/or may be utilized as an interface to the CIM. For instance, the WMI may be utilized to provide and/or send CIM object information to OS 162.

In one or more embodiments, processor 120 and one or more components of IHS 110 may be included in a system-on-chip (SoC). For example, the SoC may include processor 120 and a platform controller hub (not specifically illustrated).

Figure 1B:
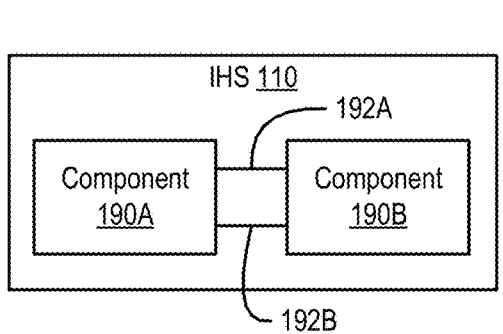
FIG. 1B illustrates another example of an information handling system, according to one or more embodiments.

Turning now to FIG. 1B, another example of an information handling system is illustrated, according to one or more embodiments. In one or more embodiments, an information handling system may include one or more transmission lines. In one example, a first component of the information handling system may utilize the one or more transmission lines to transmit one or more signals to a second component of the information handling system. In another example, the second component of the information handling system may utilize the one or more transmission lines to transmit one or more signals to the first component of the information handling system.

In one or more embodiments, as shown, IHS 110 may include components 190A and 190B and transmission lines 192A and 192B. In one example, component 190A may utilize transmission lines 192A and 192B to transmit one or more signals to component 190B. For instance, component 190B may receive the one or more signals from components 190A via one or more of transmission lines 192A and 192B. In another example, component 190B may utilize transmission lines 192A and 192B to transmit one or more signals to component 190B. For instance, component 190A may receive the one or more signals from components 190B via one or more of transmission lines 192A and 192B. In one or more embodiments, a component 190 may include one or more of processor 120, a baseboard management controller, volatile memory medium 150, non-volatile memory medium 160, non-volatile memory medium 170, I/O subsystem 175, network interface 180, a graphics processing unit, a PCB, a SoC, a platform controller hub, a host bus interface, a SerDes, a PCIe card, a PCIe switch, and a PCIe root complex, among others.

Figure 1C:
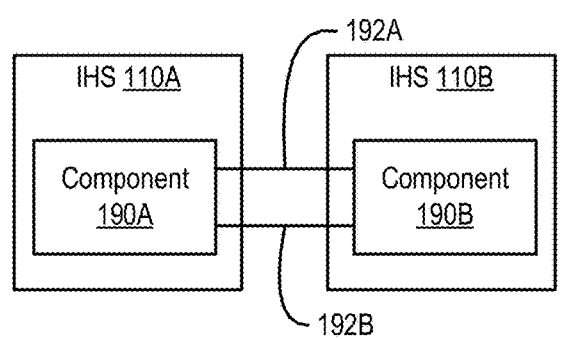
FIG. 1C illustrates an example of two information handling systems, according to one or more embodiments.

Turning now to FIG. 1C, an example of two information handling systems is illustrated, according to one or more embodiments. In one or more embodiments, a first information handling system may include a first component, and a second information handling system may include a second component. For example, the first information handling system and the second information handling system may be communicatively coupled to each other via one or more transmission lines. In one instance, a first component of the first information handling system may utilize the one or more transmission lines to transmit one or more signals to a second component of the second information handling system. In another instance, the second component of the second information handling system may utilize the one or more transmission lines to transmit one or more signals to the first component of the first information handling system.

As shown, an IHS 110A may include a component 190A. As illustrated, an IHS 110B may include a component 190B. For example, information handling systems (IHSs) 110A and 110B may be communicatively coupled to each other via transmission lines 192A and 192B. In one instance, component 190A may utilize one or more of transmission lines 192A and 192B to transmit one or more signals to component 190B. As an example, component 190B may receive the one or more signals from components 190A via one or more of transmission lines 192A and 192B. In another instance, component 190B may utilize one or more of transmission lines 192A and 192B to transmit one or more signals to component 190B. As an example, component 190A may receive the one or more signals from components 190B via one or more of transmission lines 192A and 192B. In one or more embodiments, a component 190 may include one or more of processor 120, a baseboard management controller, volatile memory medium 150, non-volatile memory medium 160, non-volatile memory medium 170, I/O subsystem 175, network interface 180, a graphics processing unit, a PCB, a SoC, a platform controller hub, a host bus interface, a SerDes, a PCIe card, a PCIe switch, and a PCIe root complex, among others.

Figure 2A:
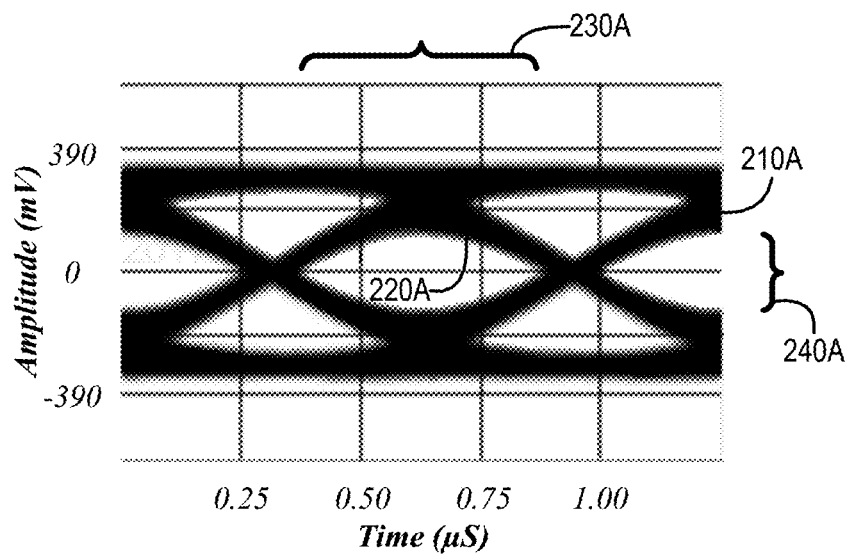
FIGS. 2A and 2B illustrate examples of plots of signals, according to one or more embodiments.
Figure 2B:
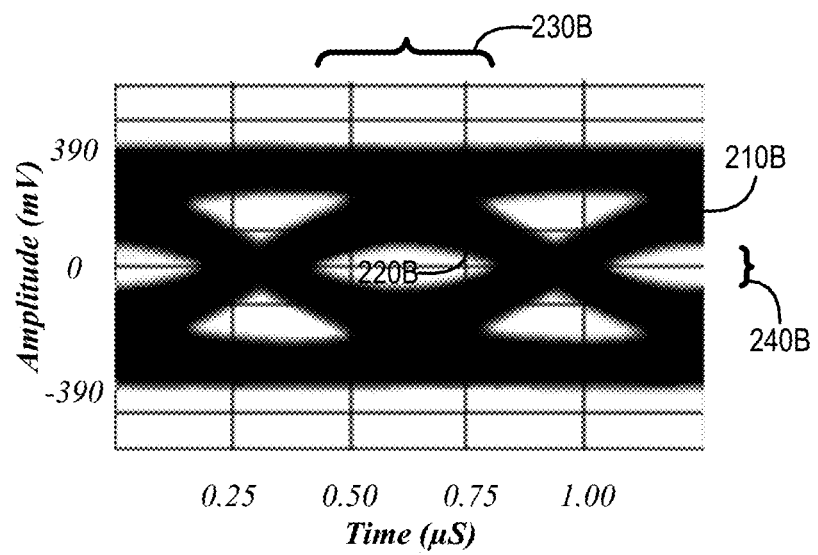

Turning now to FIGS. 2A and 2B, examples of plots of signals are illustrated, according to one or more embodiments. In one example, a first plot 210A of a first signal transmitted via transmission line 192A is shown in FIG. 2A. For instance, plot 210A of the first signal may have been sampled at a receiving end of transmission line 192A. In another example, a second plot 210B of a second signal transmitted via transmission line 192A is illustrated in FIG. 2B. For instance, plot 210B of the second signal may have been sampled at the receiving end of transmission line 192A.

In one or more embodiments, a plot 210 of a signal may be associated with an eye 220. In one example, eye 220 may be associated with a width 230. In another example, eye 220 may be associated with a height 240. In one or more embodiments, a quality of a signal may be associated with a size of eye 220. In one example, the quality of the signal may be associated with width 230 of eye 220. In another example, the quality of the signal may be associated with height 240 of eye 220.

In one or more embodiments, the second signal may be subject to crosstalk. For example, the second signal may be subject to crosstalk from one or more signals being transmitted via transmission line 192B. In one or more embodiments, a quality of the second signal may be degraded compared to a quality of the first signal. For example, the quality of the second signal may be compared to the quality of the first signal by comparing eye 220B to eye 220A. As shown, width 230B of eye 220B may be less than width 230A of eye 220A, which may indicate that the quality of the second signal may be degraded compared to the quality of the first signal, according to one or more embodiments. For example, the second signal may be subject to crosstalk, which may cause width 230B of eye 220B to be less than width 230A of eye 220A, which may indicate that the quality of the second signal may be degraded compared to the quality of the first signal. As illustrated, height 240B of eye 220B may be less than height 240A of eye 220A, which may indicate that the quality of the second signal may be degraded compared to the quality of the first signal, according to one or more embodiments. For example, the second signal may be subject to crosstalk, which may cause height 240B of eye 220B to be less than height 240A of eye 220A, which may indicate that the quality of the second signal may be degraded compared to the quality of the first signal.

Figure 2C:
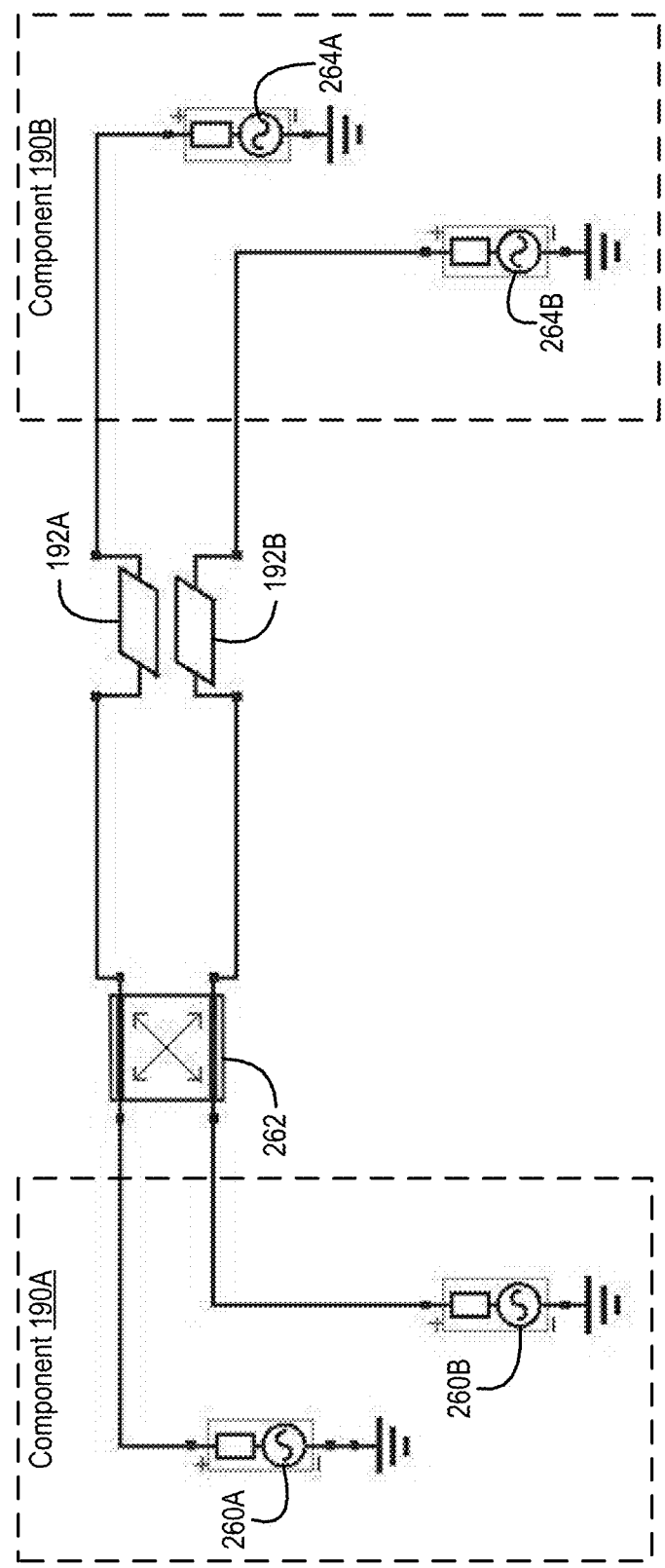
FIG. 2C illustrates an example of utilizing an electromagnetic coupler device with transmission lines, according to one or more embodiments.

Turning now to FIG. 2C, an example of utilizing an electromagnetic coupler device with transmission lines is illustrated, according to one or more embodiments. In one or more embodiments, component 190A may include transmitters 260A and 260B. For example, a transmitter 260 may transmit one or more signals. In one or more embodiments, transmitters 260A and 260B may be coupled to an electromagnetic coupler device 262, which may be coupled to transmission lines 192A and 192B. For example, transmission lines 192A and 192B may be respectively coupled to receivers 264A and 264B. For instance, component 190B may include receivers 264A and 264B. In one or more embodiments, electromagnetic coupler device 262 may mitigate crosstalk. In one example, electromagnetic coupler device 262 may mitigate or eliminate crosstalk from transmission line 192A to transmission line 192B. In another example, electromagnetic coupler device 262 may mitigate or eliminate crosstalk from transmission line 192B to transmission line 192A.

Figure 2D:
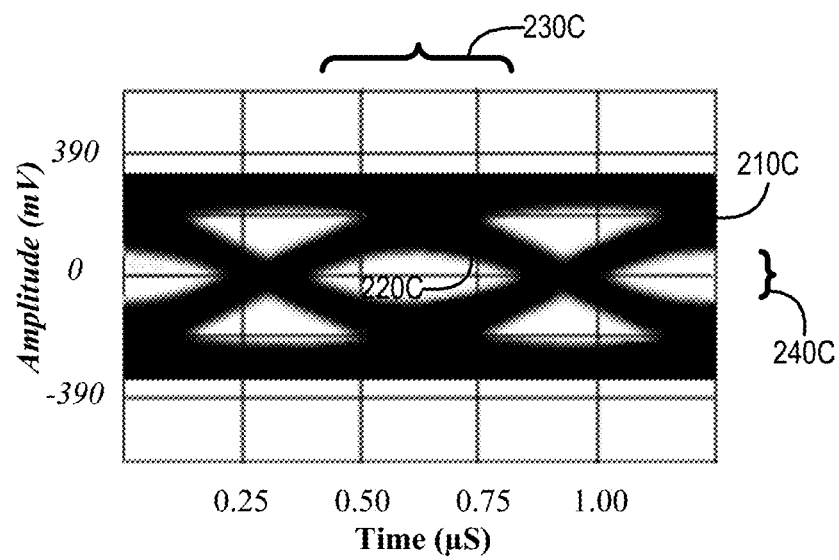
FIGS. 2D and 2E illustrate examples of plots of signals that utilize an electromagnetic coupler device, according to one or more embodiments.
Figure 2E:
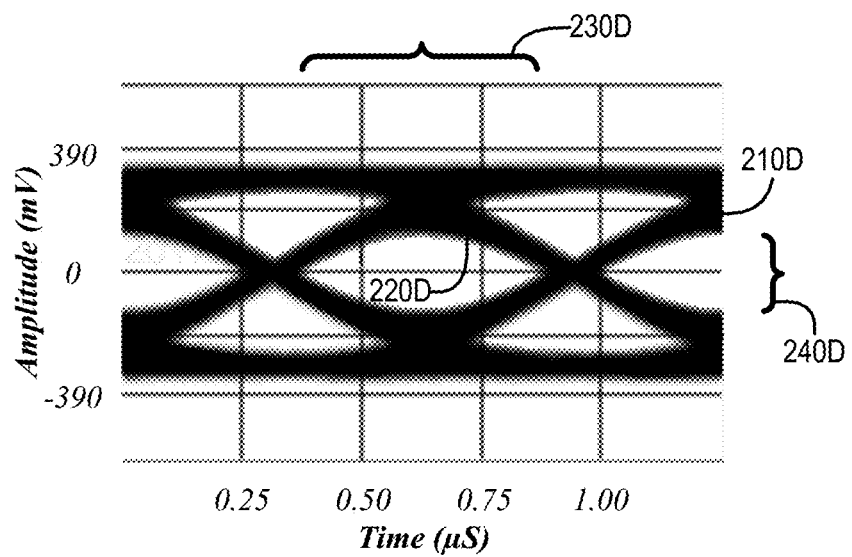

Turning now to FIGS. 2D and 2E, examples of plots of signals that utilize an electromagnetic coupler device are illustrated, according to one or more embodiments. In one example, a third plot 210C of the second signal transmitted via transmission line 192A utilizing electromagnetic coupler device 262 is illustrated in FIG. 2D. For instance, plot 210C of the second signal may have been sampled at the receiving end of transmission line 192A. In another example, a fourth plot 210D of the second signal transmitted via transmission line 192A utilizing electromagnetic coupler device 262 is illustrated in FIG. 2E. For instance, plot 210D of the second signal may have been sampled at the receiving end of transmission line 192A.

In one or more embodiments, the second signal may be subject to crosstalk. For example, the second signal may be subject to crosstalk from one or more signals being transmitted via transmission line 192B. In one or more embodiments, the crosstalk from the one or more signals being transmitted via transmission line 192B may be mitigated by electromagnetic coupler device 262. For example, utilizing electromagnetic coupler device 262 may improve the second signal. For instance, the quality of the second signal may be improved. In one or more embodiments, utilizing electromagnetic coupler device 262 may improve an eye 220C associated with the second signal. In one example, width 230C of eye 220C may be greater than width 230B of eye 220B and may be less than width 230A of eye 220A, which may indicate that electromagnetic coupler device 262 mitigates crosstalk. In another example, height 240C of eye 220C may be greater than height 240B of eye 220B and may be less than height 240A of eye 220A, which may indicate that electromagnetic coupler device 262 mitigates crosstalk.

In one or more embodiments, the crosstalk from the one or more signals being transmitted via transmission line 192B may be eliminated by electromagnetic coupler device 262. For example, utilizing electromagnetic coupler device 262 may improve the second signal. For instance, the quality of the second signal may be improved. In one or more embodiments, utilizing electromagnetic coupler device 262 may improve an eye 220D associated with the second signal. In one example, width 230D of eye 220D may be equal than width 230A of eye 220A, which may indicate that electromagnetic coupler device 262 eliminates crosstalk. In another example, height 240D of eye 220D may be equal to height 240A of eye 220A, which may indicate that electromagnetic coupler device 262 eliminates crosstalk.

Figure 3A:
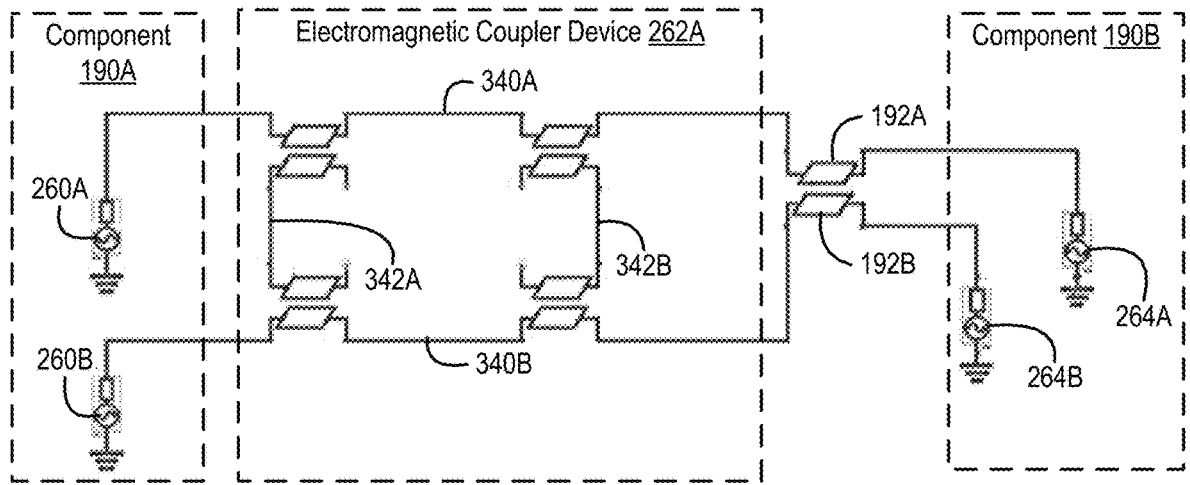
FIGS. 3A-3C illustrate examples of an electromagnetic coupler device, according to one or more embodiments.
Figure 3B:
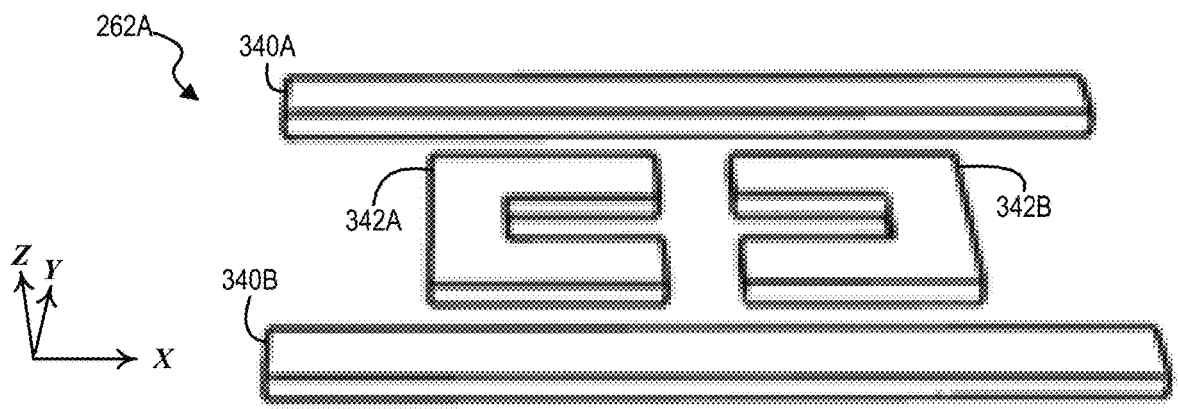
Figure 3C:
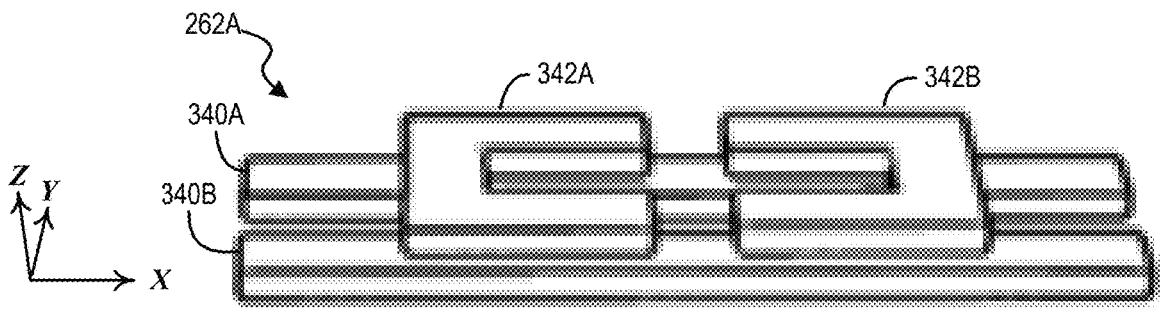

Turning now to FIGS. 3A-3C, examples of an electromagnetic coupler device are illustrated, according to one or more embodiments. In one or more embodiments, an electromagnetic coupler device 262A may include conductive elements 340A, 340B, 342A, and 342B. For example, a conductive element may include one or more metals and/or one or more semiconductors. In one instance, conductive element 340A may be connected to signal generator 260A and transmission line 192A. In a second instance, conductive element 340B may be connected to signal generator 260B and transmission line 192B. In a third instance, conductive element 342A may not be connected to signal generator 260A and may not be coupled to transmission line 192B. In fourth instance, conductive element 342B may not be connected to signal generator 260B and may not be connected to transmission line 192B. In a fifth instance, conductive element 342A may not be connected to conductive element 340A, may not be connected to conductive element 340B, may be electromagnetically coupled to conductive element 340A, and may be electromagnetically coupled to conductive element 340B. In another instance, conductive element 342B may not be connected to conductive element 340A, may not be connected to conductive element 340B, may be electromagnetically coupled to conductive element 340A, and may be electromagnetically coupled to conductive element 340B.

In one or more embodiments, connected may mean electrically connected. For example, connected may mean electrically connected without being connect via electromagnetic induction and without being connected via an electric field from capacitance.

In one or more embodiments, conductive elements 342A and 342B may resemble forward and reverse (e.g., backward) "C" shapes, respectively. In one or more embodiments, a single layer of a PCB may include conductive elements 340A, 340B, 342A, and 342B, as shown in FIG. 3B. In one or more embodiments, two layers of a PCB may include conductive elements 340A, 340B, 342A, and 342B, as shown in FIG. 3C. For example, a first layer of the PCB may include conductive elements 340A and 340B, and a second layer of the PCB may include conductive elements 342A and 342B, as shown in FIG. 3C. For instance, an insulating dielectric may separate conductive elements 340A and 340B from conductive elements 342A and 342B. As an example, conductive elements 340A and 340B may lie at a first position associated with a z-axis, and conductive elements 342A and 342B may lie at a second position associated with the z-axis, different from the first position.

Figure 3D:
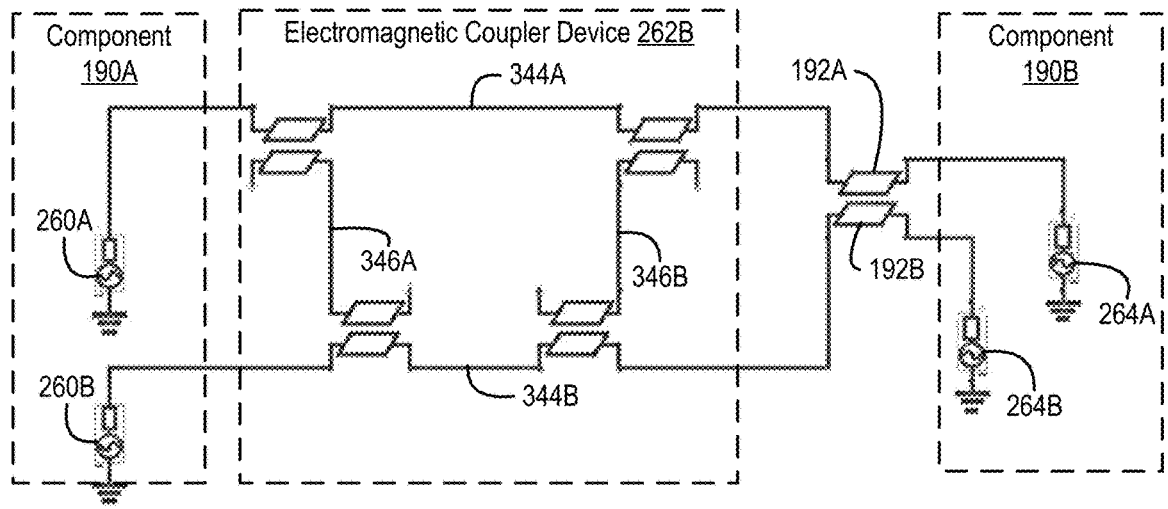
FIGS. 3D-3F illustrate second examples of an electromagnetic coupler device, according to one or more embodiments.
Figure 3E:
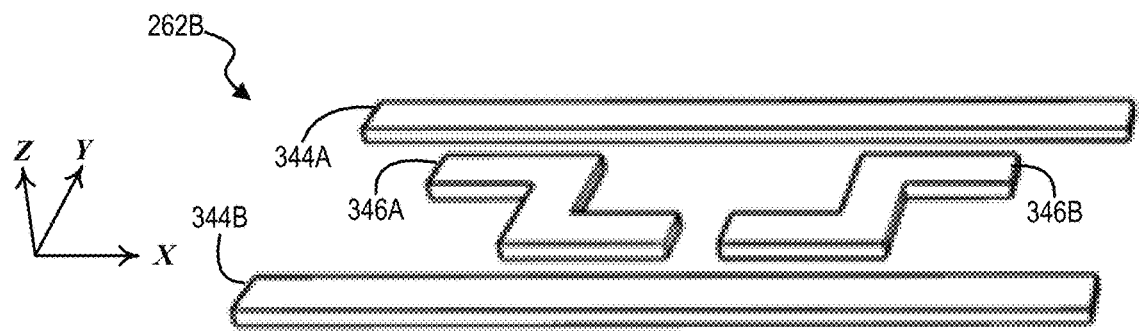
Figure 3F:
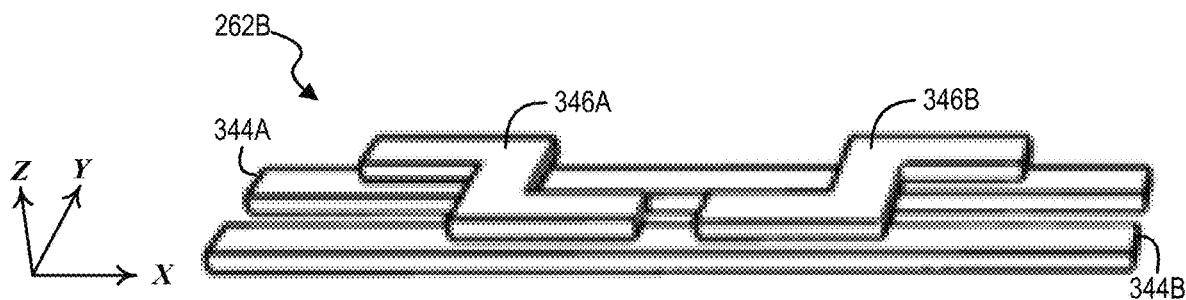

Turning now to FIGS. 3D-3F, second examples of an electromagnetic coupler device are illustrated, according to one or more embodiments. In one or more embodiments, an electromagnetic coupler device 262B may include conductive elements 344A, 344B, 346A, and 346B. For example, a conductive element may include one or more metals and/or one or more semiconductors. In one instance, conductive element 344A may be connected to signal generator 260A and transmission line 192A. In a second instance, conductive element 344B may be connected to signal generator 260B and transmission line 192B. In a third instance, conductive element 346A may not be connected to signal generator 260A and may not be coupled to transmission line 192B. In fourth instance, conductive element 346B may not be connected to signal generator 260B and may not be connected to transmission line 192B. In a fifth instance, conductive element 346A may not be connected to conductive element 344A, may not be connected to conductive element 344B, may be electromagnetically coupled to conductive element 344A, and may be electromagnetically coupled to conductive element 344B. In another instance, conductive element 346B may not be connected to conductive element 344A, may not be connected to conductive element 344B, may be electromagnetically coupled to conductive element 344A, and may be electromagnetically coupled to conductive element 344B.

In one or more embodiments, conductive elements 346A and 346B may resemble forward and reverse (e.g., backward) "Z" shapes, respectively. In one or more embodiments, a single layer of a PCB may include conductive elements 344A, 344B, 346A, and 346B, as shown in FIG. 3E. In one or more embodiments, two layers of a PCB may include conductive elements 344A, 344B, 346A, and 346B, as shown in FIG. 3F. For example, a first layer of the PCB may include conductive elements 344A and 344B, and a second layer of the PCB may include conductive elements 346A and 346B, as shown in FIG. 3F. For instance, an insulating dielectric may separate conductive elements 344A and 344B from conductive elements 346A and 346B. As an example, conductive elements 344A and 344B may lie at a first position associated with a z-axis, and conductive elements 346A and 346B may lie at a second position associated with the z-axis, different from the first position.

Figure 3G:
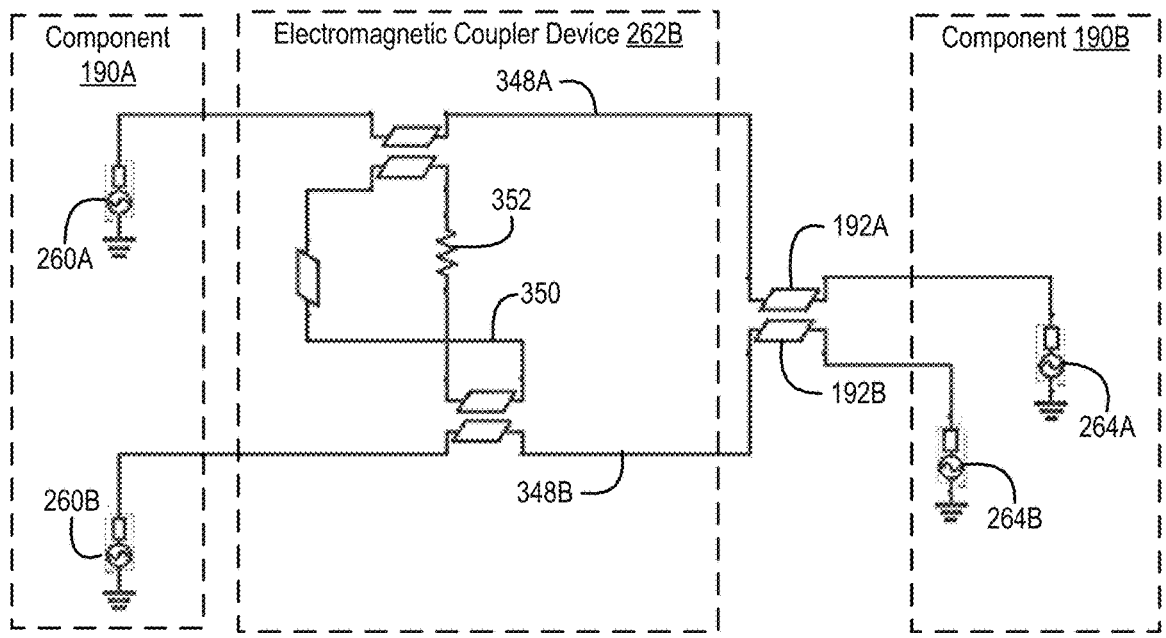
FIGS. 3G-3I illustrate third examples of an electromagnetic coupler device, according to one or more embodiments.
Figure 3H:
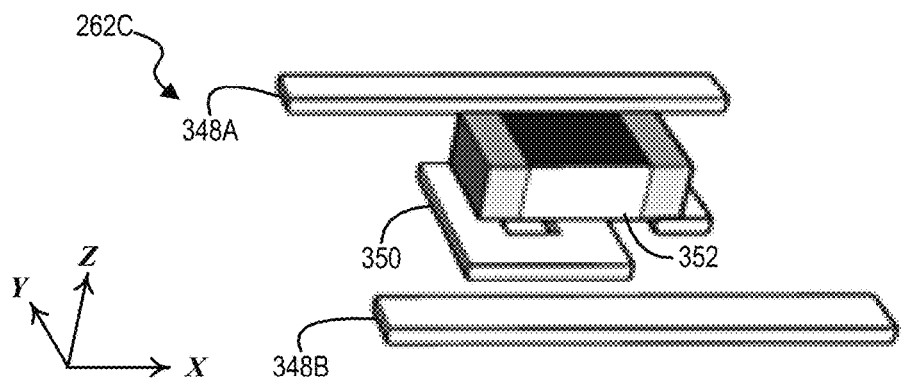
Figure 3I:
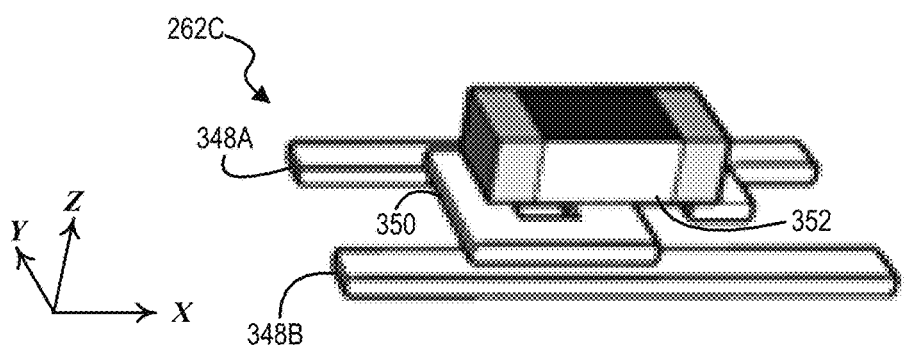

Turning now to FIGS. 3G-3I, third examples of an electromagnetic coupler device are illustrated, according to one or more embodiments. In one or more embodiments, an electromagnetic coupler device 262C may include conductive elements 348A, 348B, and 350 and a resistor 352. For example, a conductive element may include one or more metals and/or one or more semiconductors. In one instance, conductive element 348A may be connected to signal generator 260A and transmission line 192A. In a second instance, conductive element 348B may be connected to signal generator 260B and transmission line 192B. In a third instance, conductive element 350 may not be connected to signal generator 260A and may not be coupled to transmission line 192B. In fourth instance, resistor 352 may not be connected to signal generator 260B and may not be connected to transmission line 192B. In a fifth instance, conductive element 350 may not be connected to conductive element 348A, may not be connected to conductive element 348B, may be electromagnetically coupled to conductive element 348A, and may be electromagnetically coupled to conductive element 348B. In another instance, resistor 352 may be connected to a first portion (e.g., a top portion) of conductive element 350 and may be connected to a second portion (e.g., a bottom portion) of conductive element 350.

In one or more embodiments, conductive elements 350 may resemble an "S" shape. For example, resistor 352 may be connected to a top of the "S" shape and may be connect to a bottom of the S" shape. For instance, resistor 352 may be soldered to a top of the "S" shape and may be soldered to a bottom of the S" shape. In one or more embodiments, a single layer of a PCB may include conductive elements 348A, 348B, and 350, as shown in FIG. 3H. In one or more embodiments, two layers of a PCB may include conductive elements 348A, 348B, and 350, as shown in FIG. 3I. For example, a first layer of the PCB may include conductive elements 348A and 348B, and a second layer of the PCB may include conductive element 350, as shown in FIG. 3I. For instance, an insulating dielectric may separate conductive elements 348A and 348B from conductive element 350. As an example, conductive elements 348A and 348B may lie at a first position associated with a z-axis, and conductive element 350 may lie at a second position associated with the z-axis, different from the first position.

In one or more embodiments, resistor 352 may include one or more of a carbon composition resistor, a wire wound resistor, a thin film resistor, a carbon film resistor, a metal film resistor, a thick film resistor, a metal oxide resistor, a cermet oxide resistor, and a variable resistor, among others. For example, a variable resistor may include one or more of a diode and a transistor. In one instance, a diode may include one or more of a varicap, a PN junction diode (e.g., a silicon PN junction diode, a germanium diode, etc.), an avalanche diode, a zener diode, and a Schottky diode, among others. In another instance, a transistor may include one or more of a bipolar junction transistor and a field effect transistor (e.g., a junction field effect transistor, a metal oxide semiconductor field effect transistor, etc.), among others. In one or more embodiments, a resistance value associated with resistor 352 may be utilized to tune electromagnetic coupler device 262C to one or more frequencies of one or more signals.

Figure 3J:
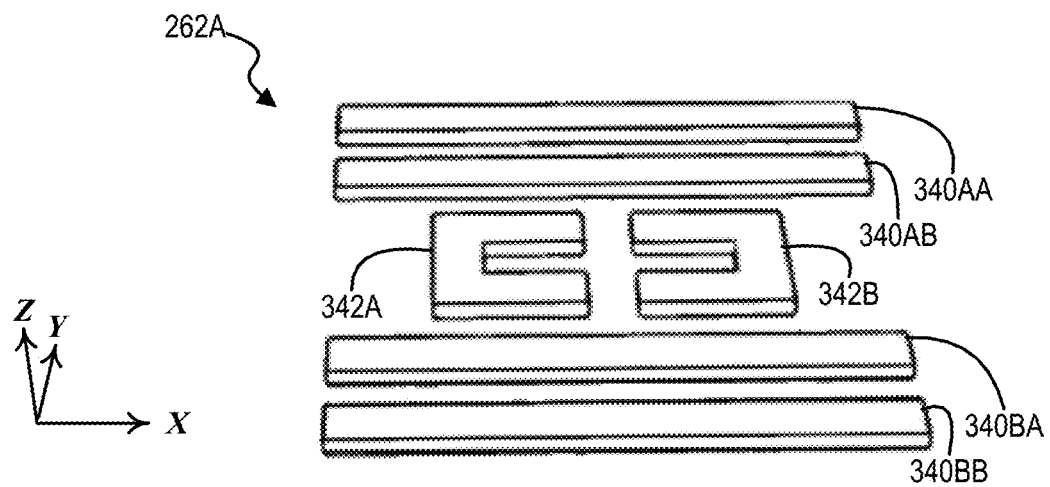
FIGS. 3J and 3K illustrate examples of an electromagnetic coupler device that can be utilized with differential pairs, according to one or more embodiments.
Figure 3K:
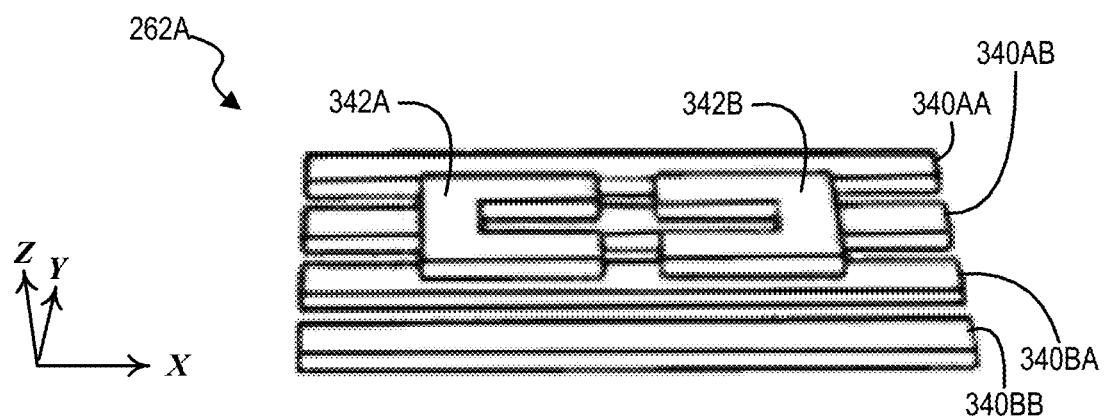

Turning now to FIGS. 3J and 3K, examples of an electromagnetic coupler device that can be utilized with differential pairs are illustrated, according to one or more embodiments. In one or more embodiments, electromagnetic coupler device 262A may include conductive elements 340AA, 340AB, 340BA, 340BB, 342A, and 342B. For example, a conductive element may include one or more metals and/or one or more semiconductors. In one or more embodiments, electromagnetic coupler device 262A may mitigate or eliminate crosstalk between two differential pairs. In one instance, conductive elements 340AA and 340AB may be connected to a first differential pair of a first signal generator (e.g., a first signal generator of a first component 190) and may be connect to a first differential pair of transmission lines 192. In another instance, conductive elements 340BA and 340BB may be connected to a second differential pair of a second signal generator (e.g., a second signal generator of the first component 190) and may be connect to a second differential pair of transmission lines 192.

In one or more embodiments, a single layer of a PCB may include conductive elements 340AA, 340AB, 340BA, 340BB, 342A, and 342B, as shown in FIG. 3J. In one or more embodiments, two layers of a PCB may include conductive elements 340AA, 340AB, 340BA, and 340BB and conductive elements 342A and 342B, as shown in FIG. 3K. For example, a first layer of the PCB may include conductive elements 340AA, 340AB, 340BA, and 340BB, and a second layer of the PCB may include conductive elements 342A and 342B, as shown in FIG. 3K. For instance, an insulating dielectric may separate conductive elements 340AA, 340AB, 340BA, and 340BB from conductive elements 342A and 342B. As an example, conductive elements 340AA, 340AB, 340BA, and 340BB may lie at a first position associated with a z-axis, and conductive elements 342A and 342B may lie at a second position associated with the z-axis, different from the first position.

Figure 3L:
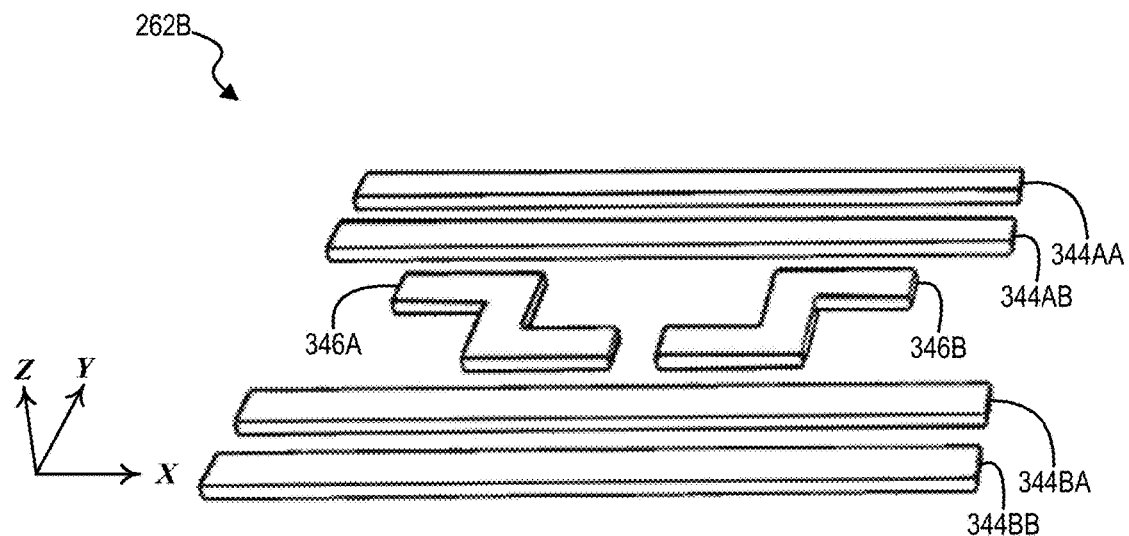
FIGS. 3L and 3M illustrate second examples of an electromagnetic coupler device that can be utilized with differential pairs, according to one or more embodiments.
Figure 3M:
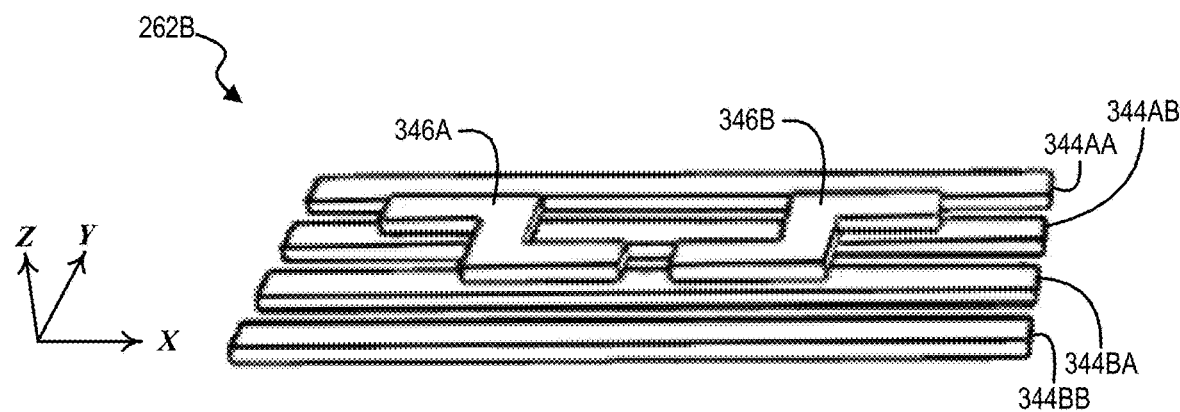

Turning now to FIGS. 3L and 3M, second examples of an electromagnetic coupler device that can be utilized with differential pairs are illustrated, according to one or more embodiments. In one or more embodiments, electromagnetic coupler device 262B may include conductive elements 344AA, 344AB, 344BA, 344BB, 346A, and 346B. For example, a conductive element may include one or more metals and/or one or more semiconductors. In one or more embodiments, electromagnetic coupler device 262B may mitigate or eliminate crosstalk between two differential pairs. In one instance, conductive elements 344AA and 344AB may be connected to a first differential pair of a first signal generator (e.g., a first signal generator of a first component 190) and may be connect to a first differential pair of transmission lines 192. In another instance, conductive elements 344BA and 344BB may be connected to a second differential pair of a second signal generator (e.g., a second signal generator of the first component 190) and may be connect to a second differential pair of transmission lines 192.

In one or more embodiments, a single layer of a PCB may include conductive elements 344AA, 344AB, 344BA, 344BB, 346A, and 346B, as shown in FIG. 3J. In one or more embodiments, two layers of a PCB may include conductive elements 344AA, 344AB, 344BA, and 344BB and conductive elements 346A and 346B, as shown in FIG. 3K. For example, a first layer of the PCB may include conductive elements 344AA, 344AB, 344BA, and 344BB, and a second layer of the PCB may include conductive elements 346A and 346B, as shown in FIG. 3K. For instance, an insulating dielectric may separate conductive elements 344AA, 344AB, 344BA, and 344BB from conductive elements 346A and 346B. As an example, conductive elements 344AA, 344AB, 344BA, and 344BB may lie at a first position associated with a z-axis, and conductive elements 346A and 346B may lie at a second position associated with the z-axis, different from the first position.

Figure 3O:
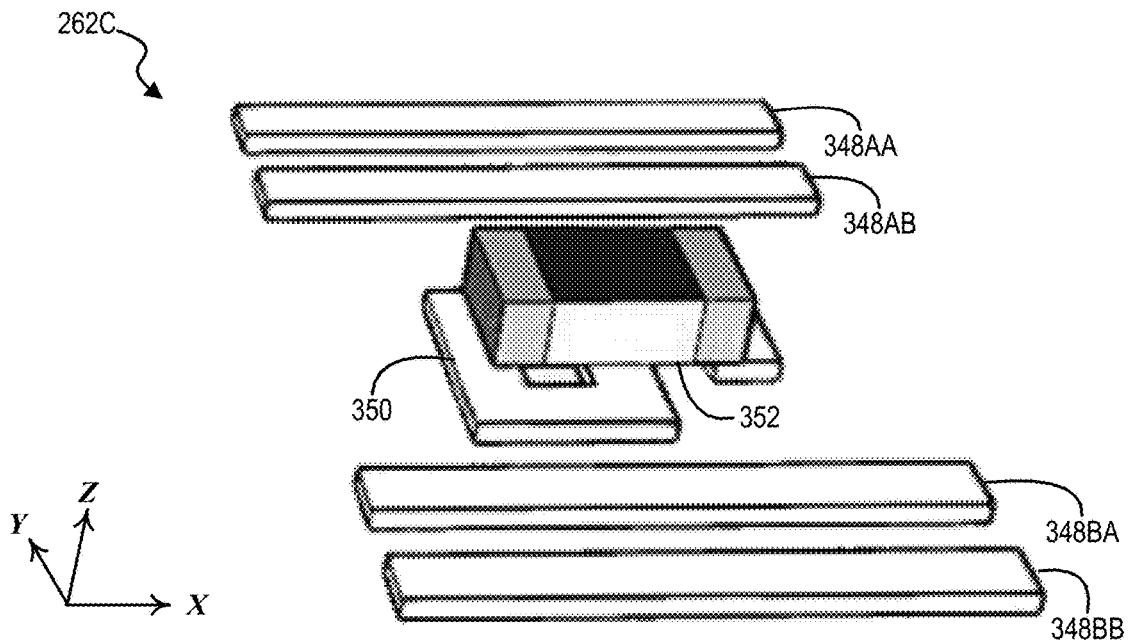
FIGS. 3O and 3P illustrate third examples of an electromagnetic coupler device that can be utilized with differential pairs, according to one or more embodiments.
Figure 3P:
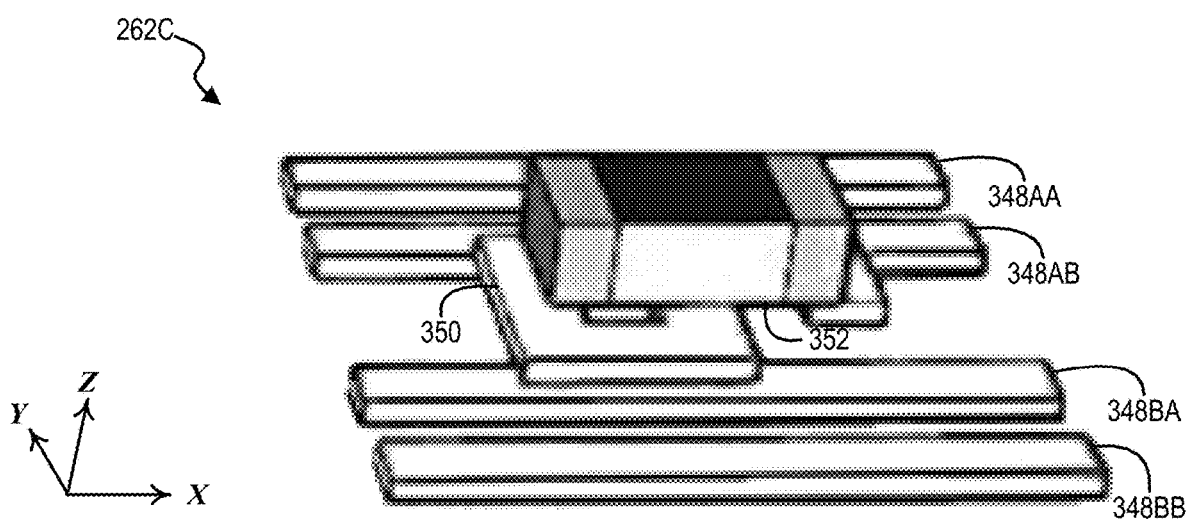

Turning now to FIGS. 3O and 3P, third examples of an electromagnetic coupler device that can be utilized with differential pairs are illustrated, according to one or more embodiments. In one or more embodiments, an electromagnetic coupler device 262C may include conductive elements 348AA, 348AB, 348BA, 348BB, and 350 and a resistor 352. For example, a conductive element may include one or more metals and/or one or more semiconductors. In one or more embodiments, electromagnetic coupler device 262C may mitigate or eliminate crosstalk between two differential pairs. In one instance, conductive elements 348AA and 348AB may be connected to a first differential pair of a first signal generator (e.g., a first signal generator of a first component 190) and may be connect to a first differential pair of transmission lines 192. In another instance, conductive elements 348BA and 348BB may be connected to a second differential pair of a second signal generator (e.g., a second signal generator of the first component 190) and may be connect to a second differential pair of transmission lines 192.

In one or more embodiments, resistor 352 may be connected to a first portion (e.g., a top portion) of conductive element 350 and may be connected to a second portion (e.g., a bottom portion) of conductive element 350. In one or more embodiments, conductive elements 350 may resemble an "S" shape. For example, resistor 352 may be connected to a top of the "S" shape and may be connect to a bottom of the "S" shape. For instance, resistor 352 may be soldered to a top of the "S" shape and may be soldered to a bottom of the "S" shape.

In one or more embodiments, a single layer of a PCB may include conductive elements 348AA, 348AB, 348BA, 348BB, and 350, as shown in FIG. 3O. In one or more embodiments, two layers of a PCB may include conductive elements 348AA, 348AB, 348BA, 348BB, and 350, as shown in FIG. 3P. For example, a first layer of the PCB may include conductive elements 348AA, 348AB, 348BA, and 348BB, and a second layer of the PCB may include conductive element 350, as shown in FIG. 3P. For instance, an insulating dielectric may separate conductive elements 348AA, 348AB, 348BA, and 348BB from conductive element 350. As an example, conductive elements 348AA, 348AB, 348BA, and 348BB may lie at a first position associated with a z-axis, and conductive element 350 may lie at a second position associated with the z-axis, different from the first position.

Figure 3Q:
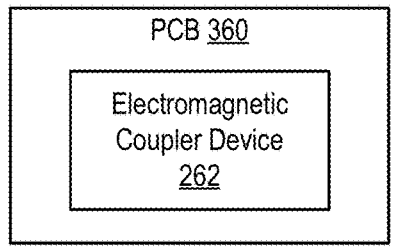
FIG. 3Q illustrates an example of a printed circuit board that includes an electromagnetic coupler device, according to one or more embodiments.

Turning now to FIG. 3Q, an example of a printed circuit board that includes an electromagnetic coupler device is illustrated, according to one or more embodiments. In one or more embodiments, a PCB 360 may include an electromagnetic coupler device 262.

Figure 3R:
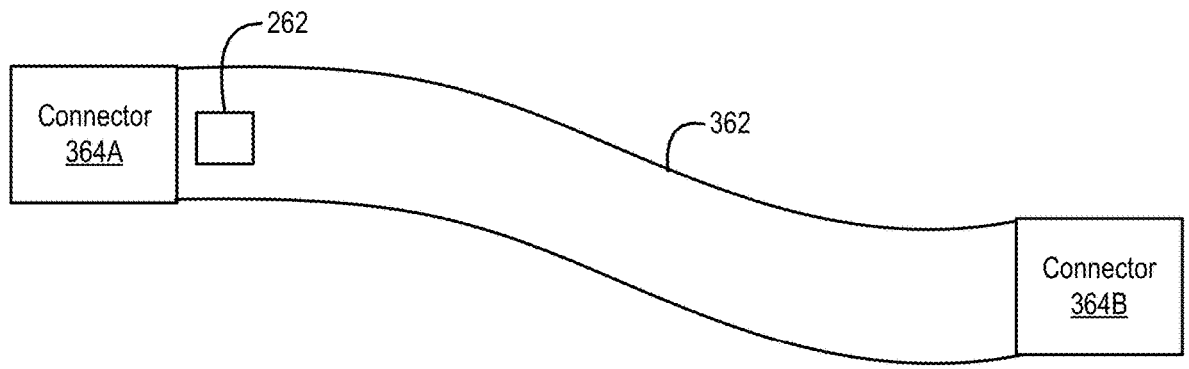
FIG. 3R illustrates an example of a cable that includes an electromagnetic coupler device, according to one or more embodiments.

Turning now to FIG. 3R, an example of a cable that includes an electromagnetic coupler device is illustrated, according to one or more embodiments. In one or more embodiments, a cable 362 may include an electromagnetic coupler device 262. In one or more embodiments, connectors 364A and 364B may be connected to ends of cable 362. In one or more embodiments, cable 362 may be a flat cable. In one or more embodiments, cable 362 may be a round cable. In one or more embodiments, cable 362 may include one or more twisted pairs of conductors. For example, cable 362 may include one or more twisted pairs of transmission lines. In one or more embodiments, connector 364A may be coupled to component 190A, and connector 364A may be coupled to component 190B. In one example, at least one of connectors 364A and 364B may be internal to an IHS 110. In a second example, at least one of connectors 364A and 364B may be external to an IHS 110. In another example, connector 364A may be coupled to IHS 110A, and connector 364B may be coupled to IHS 110B.

Figure 3S:
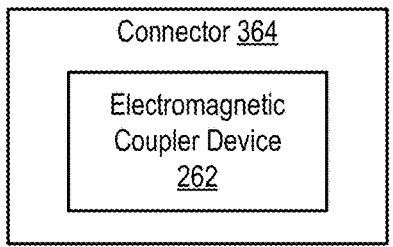
FIGS. 3S and 3T illustrate examples of a connector that includes an electromagnetic coupler device, according to one or more embodiments.
Figure 3T:
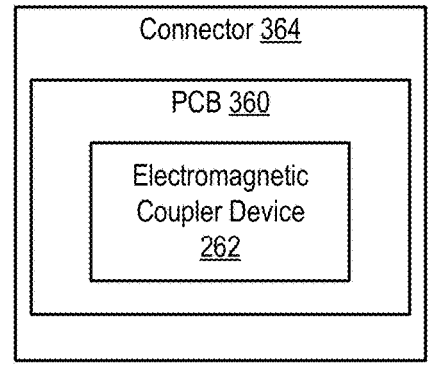

Turning now to FIGS. 3S and 3T, examples of a connector that includes an electromagnetic coupler device are illustrated, according to one or more embodiments. In one example, a connector 364 may include an electromagnetic coupler device 262, as shown in FIG. 3S. In another example, a connector 364 may include a PCB 360, which may include an electromagnetic coupler device 262, as illustrated in FIG. 3T.

Figure 3U:
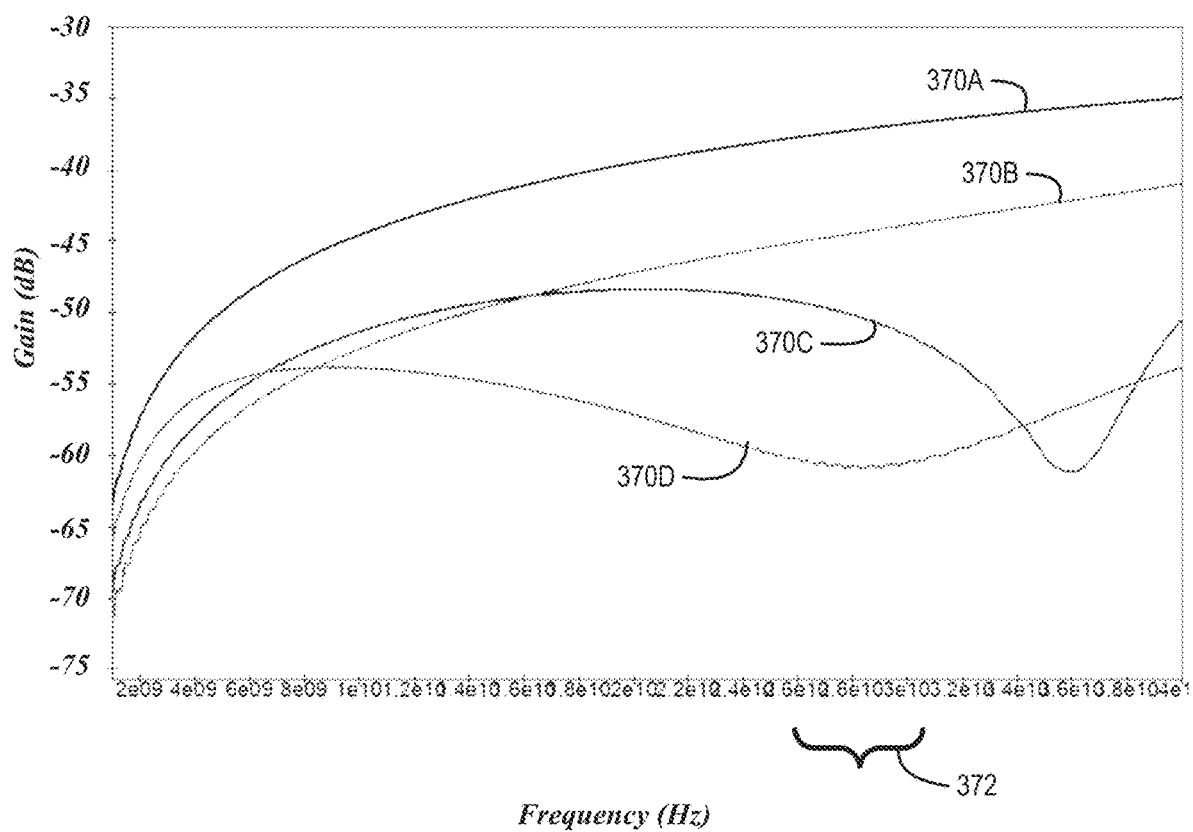
FIG. 3U illustrates examples of plots of signal integrity performance of electromagnetic coupler devices in decibels versus frequency, according to one or more embodiments.

Turning now to FIG. 3U, examples of plots of signal integrity performance of electromagnetic coupler devices in decibels versus frequency are illustrated, according to one or more embodiments. In one or more embodiments, signal integrity performances of an electromagnetic coupler device 262 with two adjacent three hundred millimeter (300 mm) cables are show via plots 370B-370D. For instance, a vertical axis is in decibels (dB), and a horizontal axis is in Hertz (Hz).

In one example, a plot 370A illustrates crosstalk associated with a cable without an electromagnetic coupler device 262. In a second example, plot 370B illustrates crosstalk associated electromagnetic coupler device 262A with two adjacent 300 mm cables. In a third example, plot 370C illustrates crosstalk associated electromagnetic coupler device 262B with two adjacent 300 mm cables. In another example, plot 370D illustrates crosstalk associated electromagnetic coupler device 262C with two adjacent 300 mm cables.

In one or more embodiments, a frequency range 372 may be configured via a resistance value associated with resistor 352. For example, electromagnetic coupler device 262C may be tuned to frequency range 372 via configuring a resistance value associated with resistor 352. Although frequency range 372 is shown as a specific frequency range in FIG. 3U, frequency range 372 may be any frequency range, according to one or more embodiments. In one or more embodiments, range 372 may be configured during a training to optimize an end-to-end crosstalk mitigation or elimination. For example, range 372 may be configured during a training to optimize an end-to-end crosstalk mitigation or elimination over a bus. For instance, this may permit denser designs, since trace-to-trace isolation may be reduced and connector crosstalk requirements may be relaxed.

Figure 3V:
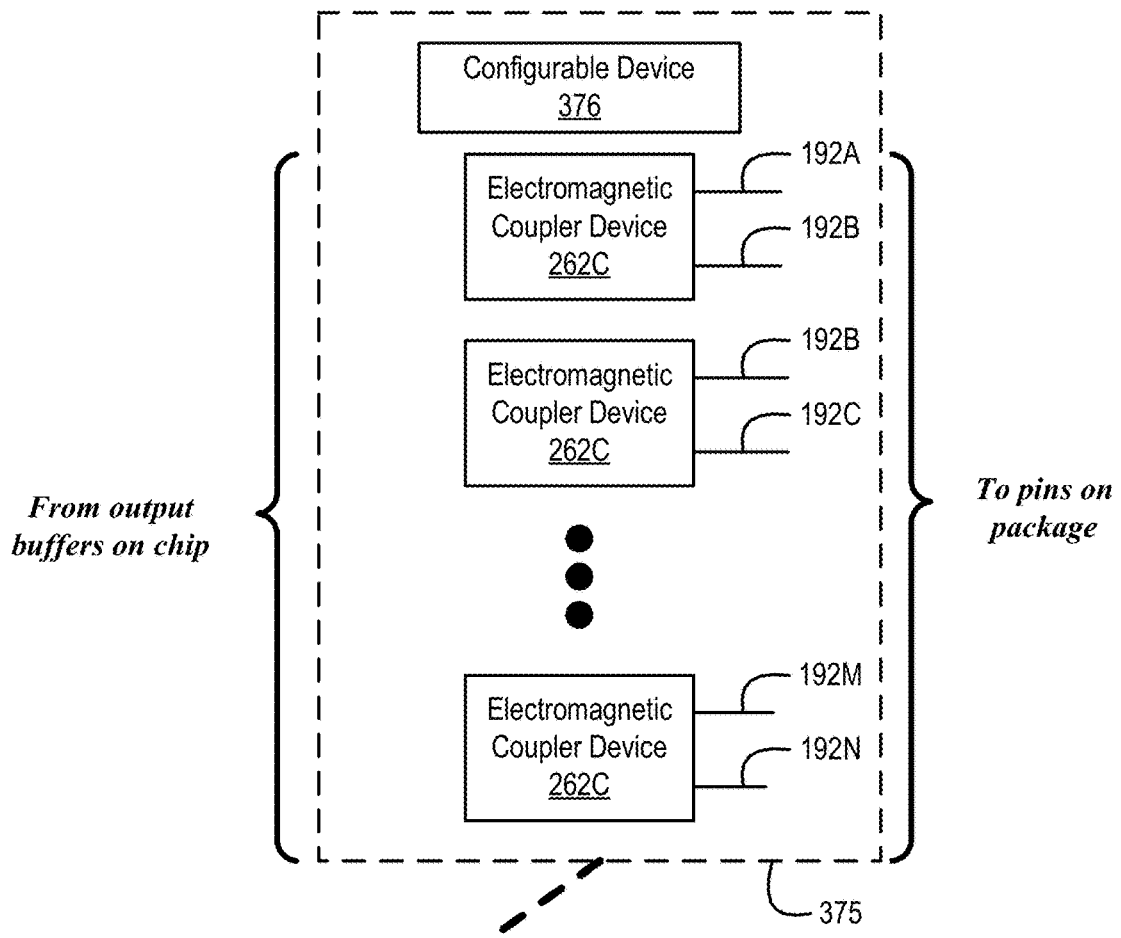
FIG. 3V illustrates an example of electromagnetic coupler devices utilized with a bus, according to one or more embodiments.
Figure 3V:
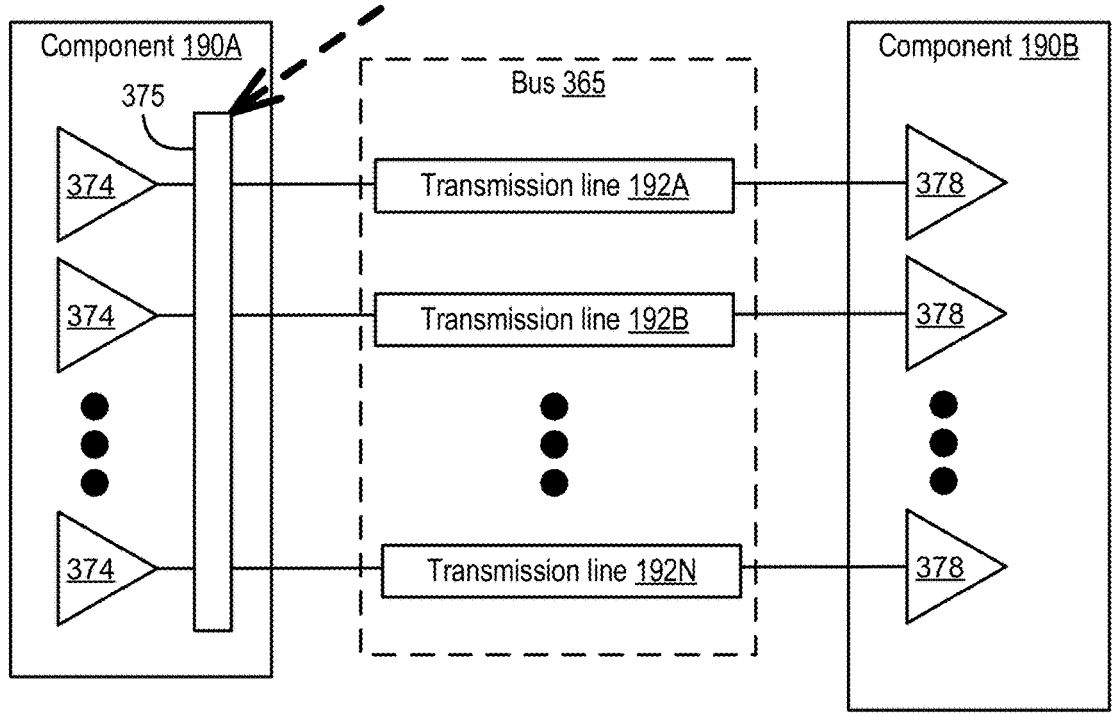

Turning now to FIG. 3V, an example of electromagnetic coupler devices utilized with a bus is illustrated, according to one or more embodiments. In one or more embodiments, transmitters 374 may be coupled to a system 375 of electromagnetic coupler devices 262C. For example, system 375 of electromagnetic coupler devices 262C may be coupled to a bus 365 of transmission lines 192A-192N. For instance, bus 365 of transmission lines 192 may be coupled to receivers 378. Although bus 365 is illustrated with transmission lines 192A-192N (e.g., channels), bus 365 may include any number of transmission lines 192, according to one or more embodiments.

In one or more embodiments, system 375 may receive feedback information from receivers 378. For example, system 375 may utilize the feedback information from receivers 378 to minimize crosstalk from transmission line 192 of bus 365. In one instance, system 375 may configure electromagnetic coupler devices 262C based at least on the feedback information from receivers 378 to minimize crosstalk from transmission lines 192 of bus 365. In another instance, system 375 may tune electromagnetic coupler devices 262C based at least on the feedback information from receivers 378 to minimize crosstalk from transmission lines 192 of bus 365.

In one or more embodiments, system 375 may include a configurable device 376 that may be configured and/or programmed to receive information associated with setting the variable resistor to the resistance value. For example, device 376 may include a field programmable gate array, one or more processors, one or more microcontrollers, one or more non-volatile memory media, and/or one or more volatile memory media, among others, which may be configured to implement at least a portion of one or more systems, at least a portion of one or more flowcharts, at least a portion of one or more methods, and/or at least a portion of one or more processes described herein. In one or more embodiments, a resistor 352 of an electromagnetic coupler device 262C may be a variable resistor. For example, configurable device 376 may be configured and/or programmed to configure a variable resistor 352 of an electromagnetic coupler device 262C to a resistance value. For instance, configurable device 376 may be configured and/or may be programmed to configure one or more variable resistors 352 of respective one or more electromagnetic coupler devices 262C to respective resistance values to tune the respective one or more electromagnetic coupler devices 262C for one or more of a bus (e.g., bus 365) and a cable (e.g., cable 362), among others. As an example, configurable device 376 may be configured and/or may be programmed to configure one or more variable resistors 352 of respective one or more electromagnetic coupler devices 262C to respective resistance values to tune the respective one or more electromagnetic coupler devices 262C for transmission lines 192 of a bus 365. As another example, configurable device 376 may be configured and/or may be programmed to configure one or more variable resistors 352 of respective one or more electromagnetic coupler devices 262C to respective resistance values to tune the respective one or more electromagnetic coupler devices 262C for transmission lines 192 of a cable 362.

Figure 4:
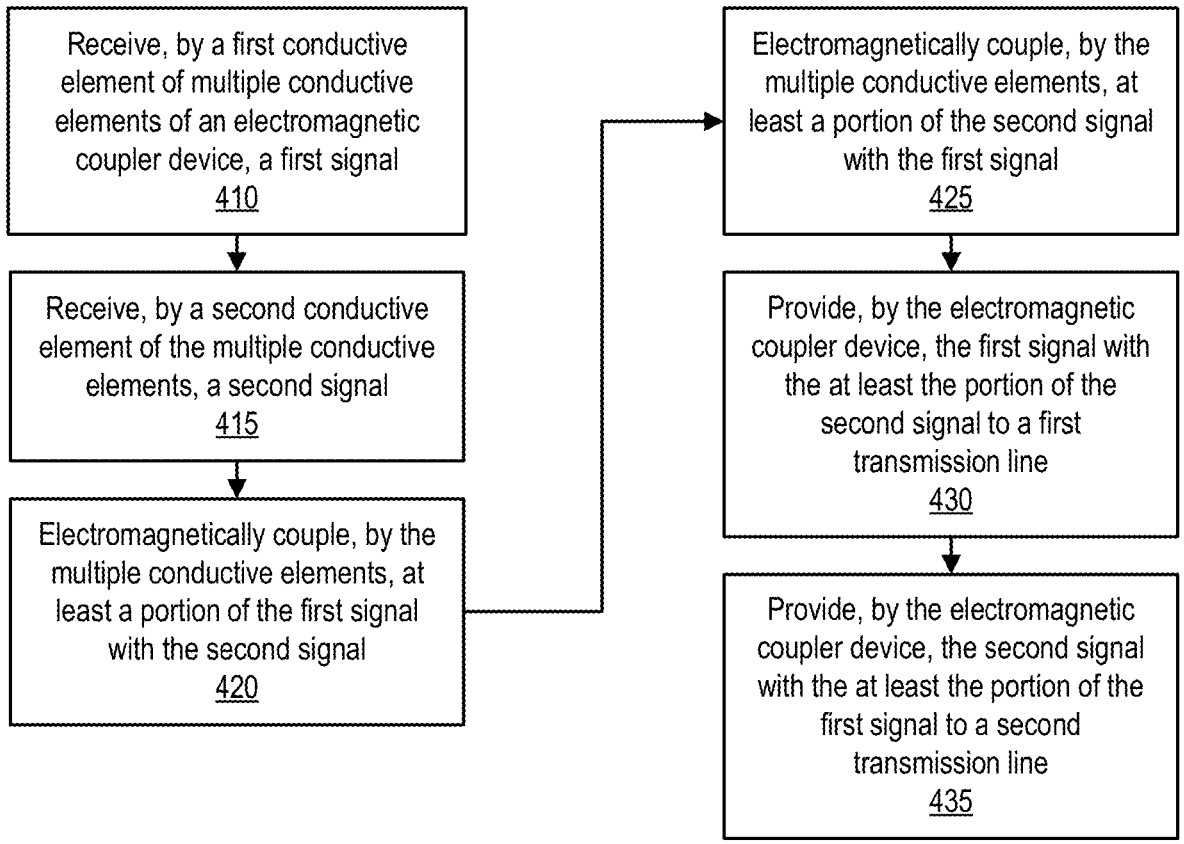
FIG. 4 illustrates an example of a method of utilizing an electromagnetic coupler device, according to one or more embodiments.

Turning now to FIG. 4, an example of a method of utilizing an electromagnetic coupler device is illustrated, according to one or more embodiments. At 410, a first conductive element of multiple conductive elements of an electromagnetic coupler device may receive a first signal. In one example, conductive element 340A electromagnetic coupler device 262A may receive a first signal. In a second example, conductive element 344A electromagnetic coupler device 262B may receive a first signal. In another example, conductive element 348A electromagnetic coupler device 262C may receive a first signal. In one or more embodiments, the first signal may be a first electromagnetic signal. For example, the first signal may be a first analog electromagnetic signal.

At 415, a second conductive element of the multiple conductive elements may receive a second signal. In one example, conductive element 340B electromagnetic coupler device 262A may receive a second signal. In a second example, conductive element 344B electromagnetic coupler device 262B may receive a second signal. In another example, conductive element 348B electromagnetic coupler device 262C may receive a second signal. In one or more embodiments, the second signal may be a second electromagnetic signal. For example, the second signal may be a second analog electromagnetic signal.

At 420, the multiple conductive elements may electromagnetically couple at least a portion of the first signal with the second signal. In one example, three or more of conductive elements 340A, 340B, 342A, and 342B of electromagnetic coupler device 262A may electromagnetically couple at least a portion of the first signal with the second signal. In a second example, three or more of conductive elements 344A, 344B, 346A, and 346B of electromagnetic coupler device 262B may electromagnetically couple at least a portion of the first signal with the second signal. In another example, three or more of conductive elements 348A, 348B, 350, and 352 of electromagnetic coupler device 262C may electromagnetically couple at least a portion of the first signal with the second signal. In one or more embodiments, conductive element 352 may be or may include a resistor. For example, conductive element 352 may conduct one or more signals with an associated resistance value. In one or more embodiments, electromagnetically coupling at least a portion of the first signal with the second signal may include electromagnetically mixing at least a portion of the first signal with the second signal. In one or more embodiments, electromagnetically coupling at least a portion of the first signal with the second signal may include electromagnetically adding at least a portion of the first signal to the second signal. In one or more embodiments, electromagnetically coupling at least a portion of the first signal with the second signal may include electromagnetically subtracting at least a portion of the first signal from the second signal.

At 425, the multiple conductive elements may electromagnetically couple at least a portion of the second signal with the first signal. In one example, three or more of conductive elements 340A, 340B, 342A, and 342B of electromagnetic coupler device 262A may electromagnetically couple at least a portion of the second signal with the first signal. In a second example, three or more of conductive elements 344A, 344B, 346A, and 346B of electromagnetic coupler device 262B may electromagnetically couple at least a portion of the second signal with the first signal. In another example, three or more of conductive elements 348A, 348B, 350, and 352 of electromagnetic coupler device 262C may electromagnetically couple at least a portion of the second signal with the first signal. In one or more embodiments, conductive element 352 may be or may include a resistor. For example, conductive element 352 may conduct one or more signals with an associated resistance value. In one or more embodiments, electromagnetically coupling at least a portion of the second signal with the first signal may include electromagnetically mixing at least a portion of the second signal with the first signal. In one or more embodiments, electromagnetically coupling at least a portion of the second signal with the first signal may include electromagnetically adding at least a portion of the second signal to the first signal. In one or more embodiments, electromagnetically coupling at least a portion of the second signal with the first signal may include electromagnetically subtracting at least a portion of the second signal from the first signal.

At 430, the electromagnetic coupler device may provide the first signal with the at least the portion of the second signal to a first transmission line. In one example, conductive element 340A electromagnetic coupler device 262A may provide the first signal with the at least the portion of the second signal to a first transmission line. In a second example, conductive element 344A electromagnetic coupler device 262B may provide the first signal with the at least the portion of the second signal to a first transmission line. In another example, conductive element 348A electromagnetic coupler device 262C may provide the first signal with the at least the portion of the second signal to a first transmission line. In one or more embodiments, the first transmission line may be a first transmission line of a cable 362. In one or more embodiments, the first transmission line may be a first transmission line of a bus 365. In one or more embodiments, the first transmission line may be transmission line 192A.

At 435, the electromagnetic coupler device may provide the second signal with the at least the portion of the first signal to a second transmission line. In one example, conductive element 340B electromagnetic coupler device 262A may provide the second signal with the at least the portion of the first signal to a second transmission line. In a second example, conductive element 344B electromagnetic coupler device 262B may provide the second signal with the at least the portion of the first signal to a second transmission line. In another example, conductive element 348B electromagnetic coupler device 262C may provide the second signal with the at least the portion of the first signal to a second transmission line. In one or more embodiments, the second transmission line may be a second transmission line of a cable 362. In one or more embodiments, the second transmission line may be a second transmission line of a bus 365. In one or more embodiments, the second transmission line may be transmission line 192B.

Figure 5A:
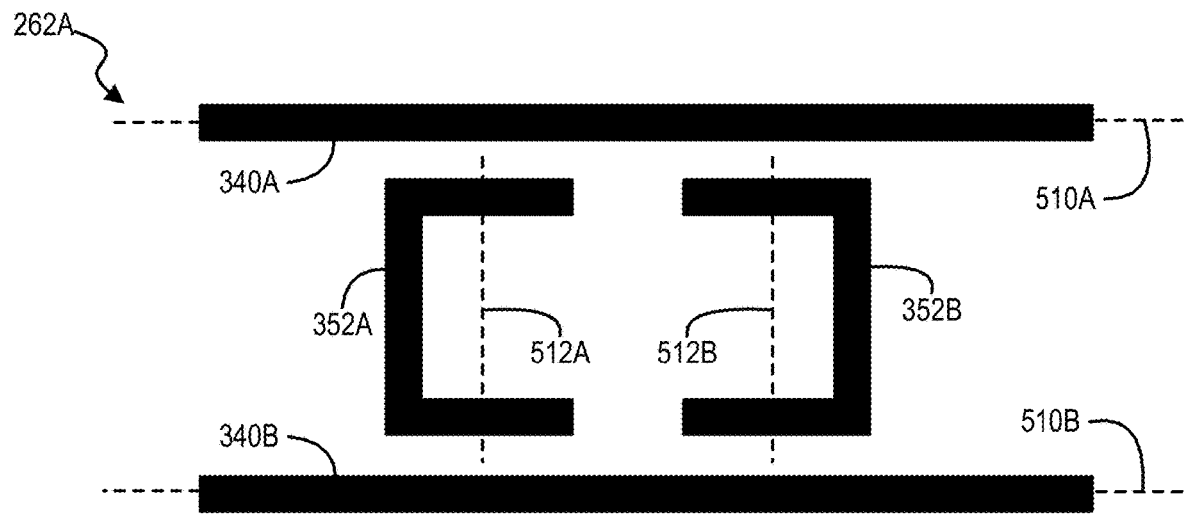
FIG. 5A illustrates an example of an electromagnetic coupler device and longitudinal axes associated with the electromagnetic coupler device, according to one or more embodiments.

In one or more embodiments, a third conductive element of the multiple conductive elements may have a forward "C" shape. For example, the third conductive element may be conductive element 342A. In one instance, a longitudinal axis 510A of conductive element 340A may be perpendicular to a longitudinal axis 512A of conductive element 342A, as illustrated in FIG. 5A. In another instance, a longitudinal axis 510B of conductive element 340B may be perpendicular to longitudinal axis 512A of conductive element 342A, as illustrated in FIG. 5A. In one or more embodiments, a fourth conductive element of the multiple conductive elements has a backwards "C" shape. For example, the fourth conductive element may be conductive element 342B. In one instance, longitudinal axis 510A of conductive element 340A may be perpendicular to a longitudinal axis 512B of conductive element 342B, as illustrated in FIG. 5A. In another instance, longitudinal axis 510B of conductive element 340B may be perpendicular to longitudinal axis 512B of conductive element 342B, as illustrated in FIG. 5A.

Figure 5B:
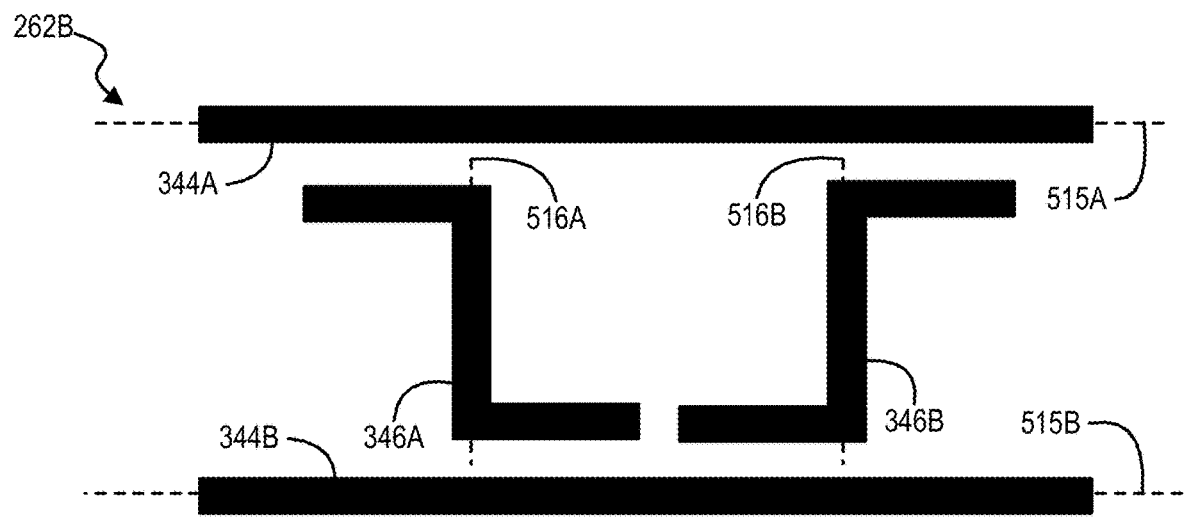
FIG. 5B illustrates a second example of an electromagnetic coupler device and longitudinal axes associated with the electromagnetic coupler device, according to one or more embodiments.

In one or more embodiments, a third conductive element of the multiple conductive elements has a forward "Z" shape. For example, the third conductive element may be conductive element 346A. In one instance, a longitudinal axis 514A of conductive element 346A may be perpendicular to a longitudinal axis 516A of conductive element 346A, as illustrated in FIG. 5B. In another instance, a longitudinal axis 514B of conductive element 344B may be perpendicular to longitudinal axis 516A of conductive element 346A, as illustrated in FIG. 5B. In one or more embodiments, a fourth conductive element of the multiple conductive elements has a backwards "Z" shape. For example, the fourth conductive element may be conductive element 346B. In one instance, longitudinal axis 514A of conductive element 344A may be perpendicular to a longitudinal axis 516B of conductive element 346B, as illustrated in FIG. 5B. In another instance, longitudinal axis 514B of conductive element 346B may be perpendicular to longitudinal axis 516B of conductive element 346B, as illustrated in FIG. 5B.

In one or more embodiments, the first conductive element and the second conductive element are parallel to each other. In one example, the first conductive element may be conductive element 340A, the second conductive element may be conductive element 340B, and conductive element 340A and conductive element 340B may be parallel to each other. In one instance, the third conductive element may be conductive element 342A, and conductive element 342A may be between conductive element 340A and conductive element 340B. In another instance, the fourth conductive element may be conductive element 342B, and conductive element 342B may be between conductive element 340A and conductive element 340B.

In a second example, the first conductive element may be conductive element 344A, the second conductive element may be conductive element 344B, and conductive element 344A and conductive element 344B may be parallel to each other. In one instance, the third conductive element may be conductive element 346A, and conductive element 346A may be between conductive element 344A and conductive element 344B. In another instance, the fourth conductive element may be conductive element 346B, and conductive element 346B may be between conductive element 344A and conductive element 344B.

In another example, the first conductive element may be conductive element 348A, the second conductive element may be conductive element 348B, and conductive element 348A and conductive element 348B may be parallel to each other. In one instance, the third conductive element may be conductive element 350, and conductive element 350 may be between conductive element 348A and conductive element 348B. In another instance, the fourth conductive element may be conductive element 352, and conductive element 350 may be between conductive element 348A and conductive element 348B.

Figure 5C:
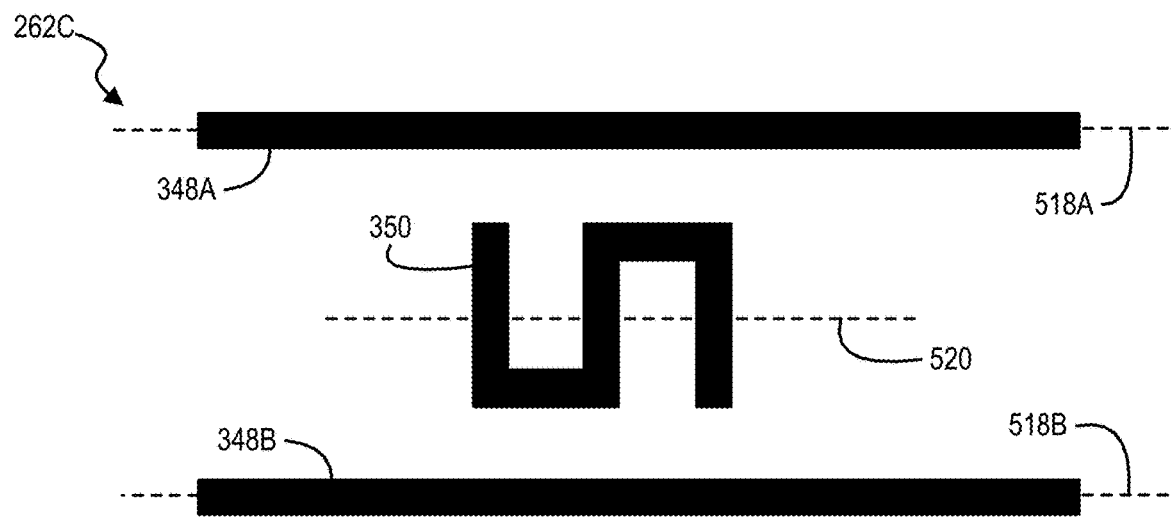
FIG. 5C illustrates a third example of an electromagnetic coupler device and longitudinal axes associated with the electromagnetic coupler device, according to one or more embodiments.

In one or more embodiments, a third conductive element of the multiple conductive elements may have an "S" shape. For example, the third conductive element, which may have an "S" shape, may be conductive element 350. In one or more embodiments, an "S" shape of conductive element 350 may have longitudinal axis 520, as shown in FIG. 5C. In one instance, a longitudinal axis 518A of conductive element 348A may be parallel to a longitudinal axis 520 of conductive element 350, as illustrated in FIG. 5C. In a second instance, a longitudinal axis 518B of conductive element 348B may be parallel to longitudinal axis 520 of conductive element 350, as shown in FIG. 5C. In another instance, longitudinal axes 518A and 518B may be parallel to each other, as illustrated in FIG. 5C.

Figure 5D:
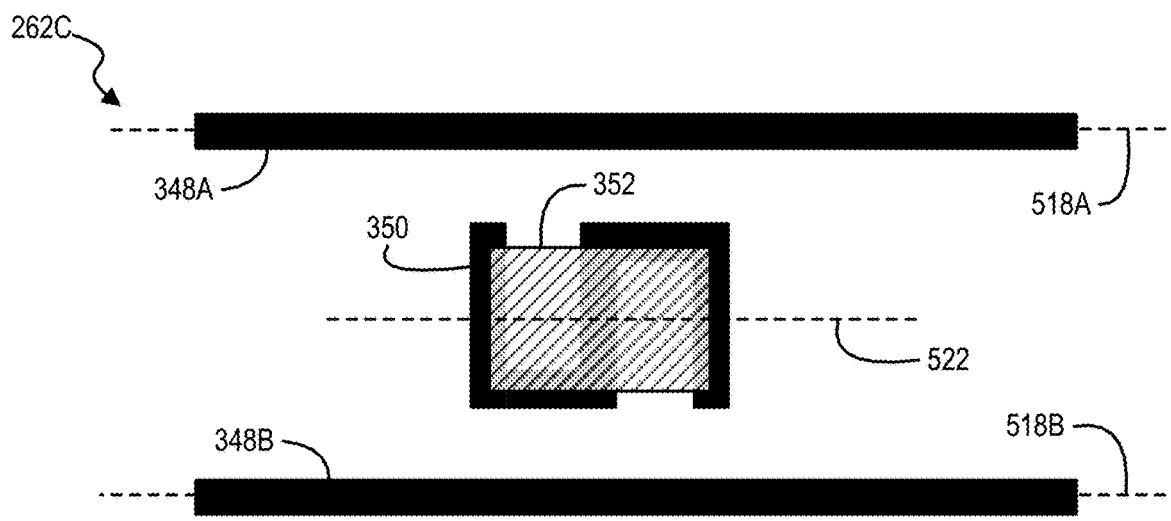
FIG. 5D illustrates another example of an electromagnetic coupler device and longitudinal axes associated with the electromagnetic coupler device, according to one or more embodiments.

In one or more embodiments, a fourth conductive element of the multiple conductive elements may be a resistor. For example, the fourth conductive element may be resistor 352. In one instance, longitudinal axis 518A of conductive element 348A may be parallel to a longitudinal axis 522 of conductive element 352, as shown in FIG. 5D. In another instance, longitudinal axis 518B of conductive element 348B may be parallel to longitudinal axis 522 of conductive element 352, as illustrated in FIG. 5D. In one or more embodiments, longitudinal axis 520 of conductive element 350 may be parallel to longitudinal axis 522 of conductive element 352. In one or more embodiments, the fourth conductive element (e.g., resistor 352) may be soldered to a top of the "S" of the third conductive element (e.g., conductive element 350) and is soldered to a bottom of the "S" of the third conductive element (e.g., conductive element 350).

In one or more embodiments, resistor 352 may be a variable resistor. For example, a variable resistor may include one or more of a diode and a transistor, among others. In one instance, a diode may include one or more of a varicap, a PN junction diode (e.g., a silicon PN junction diode, a germanium PN junction diode, etc.), an avalanche diode, a zener diode, and a Schottky diode, among others. In another instance, a transistor may include one or more of a bipolar junction transistor and a field effect transistor (e.g., a junction field effect transistor, a metal oxide semiconductor field effect transistor, etc.), among others.

In one or more embodiments, the electromagnetic coupler device may receive information associated with setting the variable resistor to a resistance value. For example, the electromagnetic coupler device may configure the variable resistor to the resistance value. In one or more embodiments, the electromagnetic coupler device may include a configurable device (e.g., a field programmable gate array, a processor, a microcontroller, etc.) that may be configured and/or programmed to receive the information associated with setting the variable resistor to the resistance value. For example, the configurable device of the electromagnetic coupler device may be configured and/or programmed to configure the variable resistor to the resistance value. For instance, the configurable device of the electromagnetic coupler device may be configured and/or programmed to configure the variable resistor to the resistance value to tune the electromagnetic coupler device for one or more of a bus (e.g., bus 365) and a cable (e.g., cable 362), among others.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
an electromagnetic coupler device; and
a plurality of transmission lines connected to the electromagnetic coupler device;
wherein the electromagnetic coupler device is configured to:
receive, by a first conductive element of a plurality of conductive elements of the electromagnetic coupler device, a first signal;
receive, by a second conductive element of the plurality of conductive elements, a second signal;
electromagnetically couple, by the plurality of conductive elements, at least a portion of the first signal with the second signal;
electromagnetically couple, by the plurality of conductive elements, at least a portion of the second signal with the first signal;
provide, by the first conductive element, the first signal with the at least the portion of the second signal to a first transmission line of the plurality of transmission lines; and
provide, by the second conductive element, the second signal with the at least the portion of the first signal to a second transmission line of the plurality of transmission lines.

2. The information handling system of claim 1,
wherein a third conductive element of the plurality of conductive elements has a forward "C" shape; and
wherein a fourth conductive element of the plurality of conductive elements has a backwards "C" shape.

3. The information handling system of claim 2,
wherein the first conductive element and the second conductive element are parallel to each other;
wherein the third conductive element is between the first conductive element and the second conductive element; and
wherein the fourth conductive element is between the first conductive element and the second conductive element.

4. The information handling system of claim 1,
wherein a third conductive element of the plurality of conductive elements has a forward "Z" shape; and
wherein a fourth conductive element of the plurality of conductive elements has a backwards "Z" shape.

5. The information handling system of claim 4,
wherein the first conductive element and the second conductive element are parallel to each other;
wherein the third conductive element is between the first conductive element and the second conductive element; and
wherein the fourth conductive element is between the first conductive element and the second conductive element.

6. The information handling system of claim 1,
wherein a third conductive element of the plurality of conductive elements has an "S" shape;
wherein a fourth conductive element of the plurality of conductive elements is a resistor;
wherein the resistor is soldered to a top of the "S" shape of the third conductive element and is soldered to a bottom of the "S" shape of the third conductive element; and
wherein a longitudinal axis of the resistor is parallel to a longitudinal axis of the "S" shape of the third conductive element.

7. The information handling system of claim 6, wherein the resistor is a variable resistor.

8. The information handling system of claim 7, wherein the electromagnetic coupler device is further configured to:
receive information associated with setting the variable resistor to a resistance value; and
configure the variable resistor to the resistance value.

9. The information handling system of claim 8, wherein the variable resistor includes at least one transistor.

10. The information handling system of claim 8, wherein the variable resistor includes at least one diode.

11. A method, comprising:
receiving, by a first conductive element of a plurality of conductive elements of an electromagnetic coupler device, a first signal;
receiving, by a second conductive element of the plurality of conductive elements, a second signal;
electromagnetically coupling, by the plurality of conductive elements, at least a portion of the first signal with the second signal;

electromagnetically coupling, by the plurality of conductive elements, at least a portion of the second signal with the first signal;

providing, by the first conductive element, the first signal with the at least the portion of the second signal to a first transmission line; and providing, by the second conductive element, the second signal with the at least the portion of the first signal to a second transmission line.

12. The method of claim 11, wherein a third conductive element of the plurality of conductive elements has a forward "C" shape; and wherein a fourth conductive element of the plurality of conductive elements has a backwards "C" shape.

13. The method of claim 12, wherein the first conductive element and the second conductive element are parallel to each other;

wherein the third conductive element is between the first conductive element and the second conductive element; and wherein the fourth conductive element is between the first conductive element and the second conductive element.

14. The method of claim 11, wherein a third conductive element of the plurality of conductive elements has a forward "Z" shape; and wherein a fourth conductive element of the plurality of conductive elements has a backwards "Z" shape.

15. The method of claim 14, wherein the first conductive element and the second conductive element are parallel to each other;

wherein the third conductive element is between the first conductive element and the second conductive element; and wherein the fourth conductive element is between the first conductive element and the second conductive element.

16. The method of claim 11, wherein a third conductive element of the plurality of conductive elements has an "S" shape;

wherein a fourth conductive element of the plurality of conductive elements is a resistor;

wherein the resistor is soldered to a top of the "S" shape of the third conductive element and is soldered to a bottom of the "S" shape of the third conductive element; and wherein a longitudinal axis of the resistor is parallel to a longitudinal axis of the "S" shape of the third conductive element.

17. The method of claim 16, wherein the resistor is a variable resistor.

18. The method of claim 17, further comprising:

receiving, by the electromagnetic coupler device, information associated with setting the variable resistor to a resistance value; and configuring, by the electromagnetic coupler device, the variable resistor to the resistance value.

19. The method of claim 18, wherein the variable resistor includes at least one transistor.

20. The method of claim 18, wherein the variable resistor includes at least one diode.

* * * * *